United States Patent
Batra

(10) Patent No.: US 12,217,110 B1
(45) Date of Patent: *Feb. 4, 2025

(54) CARDS, DEVICES, SYSTEMS, METHODS AND DYNAMIC SECURITY CODES

(71) Applicant: Dynamics Inc., Cheswick, PA (US)

(72) Inventor: Gautam Batra, Sunnyvale, CA (US)

(73) Assignee: Dynamics Inc., Cheswick, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/147,479

(22) Filed: Sep. 28, 2018

Related U.S. Application Data

(63) Continuation of application No. 14/691,330, filed on Apr. 20, 2015, now Pat. No. 10,395,156, which is a
(Continued)

(51) Int. Cl.
*G06K 19/06* (2006.01)
*G06K 19/077* (2006.01)

(52) U.S. Cl.
CPC ..... *G06K 19/06206* (2013.01); *G06K 19/077* (2013.01); *G06K 19/07749* (2013.01)

(58) Field of Classification Search
CPC .......... G06K 19/06206; G06K 19/077; G06K 19/07749
See application file for complete search history.

(56) References Cited

U.S. PATENT DOCUMENTS

| 4,353,064 A | 10/1982 | Stamm |
| 4,394,654 A | 7/1983 | Hofmann-Cerfontaine |

(Continued)

FOREIGN PATENT DOCUMENTS

| JP | 05210770 A | 8/1993 |
| WO | WO9852735 | 11/1998 |

(Continued)

OTHER PUBLICATIONS

Dynamic Virtual Credit Card Nos. http:--homes.cerias.purdue.edu-~jtli-paper-fc07.pdf. As viewed on Apr. 12, 2010.
(Continued)

*Primary Examiner* — Sonji N Johnson
(74) *Attorney, Agent, or Firm* — Morris Law Group; Robert W. Morris

(57) ABSTRACT

A dynamic code may be validated by comparing the dynamic code to a verification code. The card may generate the dynamic code using a random object and a function. The random object may be generated using a random object generator. The function may be determinable using a function determination object and a look-up-table (LUT), the function determination object associable to exponents and operators, listed in the LUT, that may be combined with base variables to determine the function. The dynamic code may be determined by substituting portions of the random object for the base variables in the function. The card may communicate the dynamic code, the random object and an identifier to a remote processing facility. The remote processing facility may use the identifier to determine the function, use the random object to determine a verification code and compare the verification code to the dynamic code.

20 Claims, 6 Drawing Sheets

Related U.S. Application Data continuation of application No. 13/893,770, filed on May 14, 2013, now Pat. No. 9,033,218.

(60) Provisional application No. 61/647,112, filed on May 15, 2012.

(56) References Cited

U.S. PATENT DOCUMENTS

| | | | |
|---|---|---|---|
| 4,614,861 A * | 9/1986 | Pavlov | G06Q 20/4014 235/380 |
| 4,667,087 A | 5/1987 | Quintana | |
| 4,701,601 A | 10/1987 | Francini et al. | |
| 4,720,860 A | 1/1988 | Weiss | |
| 4,786,791 A | 11/1988 | Hodama | |
| 4,791,283 A | 12/1988 | Burkhardt | |
| 4,797,542 A | 1/1989 | Hara | |
| 5,038,251 A | 8/1991 | Sugiyama et al. | |
| 5,168,520 A | 12/1992 | Weiss | |
| 5,237,614 A | 8/1993 | Weiss | |
| 5,276,311 A | 1/1994 | Hennige | |
| 5,347,580 A | 9/1994 | Molva et al. | |
| 5,361,062 A | 11/1994 | Weiss et al. | |
| 5,412,199 A | 5/1995 | Finkelstein et al. | |
| 5,434,398 A | 7/1995 | Goldberg | |
| 5,434,405 A | 7/1995 | Finkelstein et al. | |
| 5,478,994 A | 12/1995 | Rahman | |
| 5,479,512 A | 12/1995 | Weiss | |
| 5,484,997 A | 1/1996 | Haynes | |
| 5,485,519 A | 1/1996 | Weiss | |
| 5,585,787 A | 12/1996 | Wallerstein | |
| 5,591,949 A | 1/1997 | Bernstein | |
| 5,608,203 A | 3/1997 | Finkelstein et al. | |
| 5,623,552 A | 4/1997 | Lane | |
| 5,657,388 A | 8/1997 | Weiss | |
| 5,834,747 A | 11/1998 | Cooper | |
| 5,834,756 A | 11/1998 | Gutman et al. | |
| 5,856,661 A | 1/1999 | Finkelstein et al. | |
| 5,864,623 A | 1/1999 | Messina et al. | |
| 5,907,142 A | 5/1999 | Kelsey | |
| 5,913,203 A | 6/1999 | Wong et al. | |
| 5,937,394 A | 8/1999 | Wong et al. | |
| 5,955,021 A | 9/1999 | Tiffany, III | |
| 5,956,699 A | 9/1999 | Wong et al. | |
| 6,025,054 A | 2/2000 | Tiffany, III | |
| 6,045,043 A | 4/2000 | Bashan et al. | |
| 6,076,163 A | 6/2000 | Hoffstein et al. | |
| 6,085,320 A | 7/2000 | Kaliski | |
| 6,095,416 A | 8/2000 | Grant et al. | |
| 6,130,621 A | 10/2000 | Weiss | |
| 6,145,079 A | 11/2000 | Mitty et al. | |
| 6,157,920 A | 12/2000 | Jakobsson et al. | |
| 6,161,181 A | 12/2000 | Haynes, III et al. | |
| 6,176,430 B1 | 1/2001 | Finkelstein et al. | |
| 6,182,894 B1 | 2/2001 | Hackett et al. | |
| 6,189,098 B1 | 2/2001 | Kaliski | |
| 6,199,052 B1 | 3/2001 | Mitty et al. | |
| 6,206,293 B1 | 3/2001 | Gutman et al. | |
| 6,240,184 B1 | 5/2001 | Huynh et al. | |
| 6,241,153 B1 | 6/2001 | Tiffany, III | |
| 6,256,873 B1 | 7/2001 | Tiffany, III | |
| 6,269,163 B1 | 7/2001 | Rivest et al. | |
| 6,286,022 B1 | 9/2001 | Kaliski et al. | |
| 6,308,890 B1 | 10/2001 | Cooper | |
| 6,313,724 B1 | 11/2001 | Osterweil | |
| 6,389,442 B1 | 5/2002 | Yin et al. | |
| 6,393,447 B1 | 5/2002 | Jakobsson et al. | |
| 6,411,715 B1 | 6/2002 | Liskov et al. | |
| 6,446,052 B1 | 9/2002 | Juels | |
| 6,460,141 B1 | 10/2002 | Olden | |
| 6,592,044 B1 | 7/2003 | Wong et al. | |
| 6,607,127 B2 | 8/2003 | Wong | |
| 6,609,654 B1 | 8/2003 | Anderson et al. | |
| 6,631,849 B2 | 10/2003 | Blossom | |
| 6,655,585 B2 | 12/2003 | Shinn | |
| 6,681,988 B2 | 1/2004 | Stack et al. | |
| 6,705,520 B1 | 3/2004 | Pitroda et al. | |
| 6,755,341 B1 | 6/2004 | Wong et al. | |
| 6,764,005 B2 | 7/2004 | Cooper | |
| 6,769,618 B1 | 8/2004 | Finkelstein | |
| 6,805,288 B2 * | 10/2004 | Routhenstein | G06Q 20/105 235/375 |
| 6,811,082 B2 | 11/2004 | Wong | |
| 6,813,354 B1 | 11/2004 | Jakobsson et al. | |
| 6,817,532 B2 | 11/2004 | Finkelstein | |
| 6,873,974 B1 | 3/2005 | Schutzer | |
| 6,902,116 B2 | 6/2005 | Finkelstein | |
| 6,970,070 B2 | 11/2005 | Juels et al. | |
| 6,980,969 B1 | 12/2005 | Tuchler et al. | |
| 6,985,583 B1 | 1/2006 | Brainard et al. | |
| 6,991,155 B2 | 1/2006 | Burchette, Jr. | |
| 7,013,030 B2 | 3/2006 | Wong et al. | |
| 7,035,443 B2 | 4/2006 | Wong | |
| 7,039,223 B2 | 5/2006 | Wong | |
| 7,044,394 B2 | 5/2006 | Brown | |
| 7,051,929 B2 | 5/2006 | Li | |
| 7,083,094 B2 | 8/2006 | Cooper | |
| 7,100,049 B2 | 8/2006 | Gasparini et al. | |
| 7,100,821 B2 | 9/2006 | Mehran Rasti | |
| 7,111,172 B1 | 9/2006 | Duane et al. | |
| 7,114,652 B2 | 10/2006 | Moullette et al. | |
| 7,136,514 B1 | 11/2006 | Wong | |
| 7,140,550 B2 | 11/2006 | Ramachandran | |
| 7,163,153 B2 | 1/2007 | Blossom | |
| 7,195,154 B2 | 3/2007 | Routhenstein | |
| 7,197,639 B1 | 3/2007 | Juels et al. | |
| 7,219,368 B2 | 5/2007 | Juels et al. | |
| 7,225,537 B2 | 6/2007 | Reed | |
| 7,225,994 B2 | 6/2007 | Finkelstein | |
| 7,246,752 B2 | 7/2007 | Brown | |
| 7,298,243 B2 | 11/2007 | Juels et al. | |
| 7,334,732 B2 | 2/2008 | Cooper | |
| 7,337,326 B2 | 2/2008 | Palmer et al. | |
| 7,346,775 B2 | 3/2008 | Gasparini et al. | |
| 7,356,696 B1 | 4/2008 | Jakobsson et al. | |
| 7,357,319 B1 | 4/2008 | Lin et al. | |
| 7,359,507 B2 | 4/2008 | Kaliski | |
| 7,360,688 B1 | 4/2008 | Harris | |
| 7,363,494 B2 | 4/2008 | Brainard et al. | |
| 7,380,710 B2 | 6/2008 | Brown | |
| 7,398,253 B1 | 7/2008 | Pinnell | |
| 7,404,087 B2 | 7/2008 | Teunen | |
| 7,424,570 B2 | 9/2008 | D'Albore et al. | |
| 7,427,033 B1 | 9/2008 | Roskind | |
| 7,454,349 B2 | 11/2008 | Teunen et al. | |
| 7,461,250 B1 | 12/2008 | Duane et al. | |
| 7,461,399 B2 | 12/2008 | Juels et al. | |
| 7,472,093 B2 | 12/2008 | Juels | |
| 7,472,829 B2 | 1/2009 | Brown | |
| 7,494,055 B2 | 2/2009 | Fernandes et al. | |
| 7,502,467 B2 | 3/2009 | Brainard et al. | |
| 7,502,933 B2 | 3/2009 | Jakobsson et al. | |
| 7,503,485 B1 | 3/2009 | Routhenstein | |
| 7,516,492 B1 | 4/2009 | Nisbet et al. | |
| 7,523,301 B2 | 4/2009 | Nisbet et al. | |
| 7,530,495 B2 | 5/2009 | Cooper | |
| 7,532,104 B2 | 5/2009 | Juels | |
| 7,543,739 B2 | 6/2009 | Brown et al. | |
| 7,559,464 B2 | 7/2009 | Routhenstein | |
| 7,562,221 B2 | 7/2009 | Nystrom et al. | |
| 7,562,222 B2 | 7/2009 | Gasparini et al. | |
| 7,580,898 B2 | 8/2009 | Brown et al. | |
| 7,584,153 B2 | 9/2009 | Brown et al. | |
| 7,591,426 B2 | 9/2009 | Osterweil et al. | |
| 7,591,427 B2 | 9/2009 | Osterweil | |
| 7,602,904 B2 | 10/2009 | Juels et al. | |
| 7,631,804 B2 | 12/2009 | Brown | |
| 7,639,537 B2 | 12/2009 | Sepe et al. | |
| 7,641,124 B2 | 1/2010 | Brown et al. | |
| 7,660,902 B2 | 2/2010 | Graham et al. | |
| 7,784,687 B2 | 8/2010 | Mullen et al. | |
| 7,793,851 B2 | 9/2010 | Mullen | |
| 7,828,207 B2 | 11/2010 | Cooper | |
| 7,828,220 B2 | 11/2010 | Mullen | |

(56) References Cited

U.S. PATENT DOCUMENTS

| | | | |
|---|---|---|---|
| 7,931,195 B2 | 4/2011 | Mullen | |
| 7,941,367 B2 * | 5/2011 | Bishop | G06Q 20/10 705/40 |
| 7,954,705 B2 | 6/2011 | Mullen | |
| D643,063 S | 8/2011 | Mullen et al. | |
| 8,011,577 B2 | 9/2011 | Mullen et al. | |
| 8,020,775 B2 | 9/2011 | Mullen et al. | |
| 8,066,191 B1 | 11/2011 | Cloutier et al. | |
| D651,237 S | 12/2011 | Mullen et al. | |
| D651,238 S | 12/2011 | Mullen et al. | |
| 8,074,877 B2 | 12/2011 | Mullen et al. | |
| D651,644 S | 1/2012 | Mullen et al. | |
| D652,075 S | 1/2012 | Mullen et al. | |
| D652,076 S | 1/2012 | Mullen et al. | |
| D652,448 S | 1/2012 | Mullen et al. | |
| D652,449 S | 1/2012 | Mullen et al. | |
| D652,450 S | 1/2012 | Mullen et al. | |
| D652,867 S | 1/2012 | Mullen et al. | |
| D653,288 S | 1/2012 | Mullen et al. | |
| 8,172,148 B1 | 5/2012 | Cloutier et al. | |
| D665,022 S | 8/2012 | Mullen et al. | |
| D665,447 S | 8/2012 | Mullen et al. | |
| D666,241 S | 8/2012 | Mullen et al. | |
| 8,282,007 B1 | 10/2012 | Cloutier et al. | |
| 8,286,876 B2 | 10/2012 | Mullen et al. | |
| D670,329 S | 11/2012 | Mullen et al. | |
| D670,330 S | 11/2012 | Mullen et al. | |
| D670,331 S | 11/2012 | Mullen et al. | |
| D670,332 S | 11/2012 | Mullen et al. | |
| D670,759 S | 11/2012 | Mullen et al. | |
| 8,302,872 B2 | 11/2012 | Mullen | |
| D672,389 S | 12/2012 | Mullen et al. | |
| 8,322,623 B1 | 12/2012 | Mullen et al. | |
| D674,013 S | 1/2013 | Mullen et al. | |
| 8,348,172 B1 | 1/2013 | Cloutier et al. | |
| D676,904 S | 2/2013 | Mullen et al. | |
| 8,382,000 B2 | 2/2013 | Mullen et al. | |
| 8,393,545 B1 | 3/2013 | Mullen et al. | |
| 8,393,546 B1 | 3/2013 | Yen et al. | |
| 8,413,892 B2 | 4/2013 | Mullen et al. | |
| 8,424,773 B2 | 4/2013 | Mullen et al. | |
| 8,459,548 B2 | 6/2013 | Mullen et al. | |
| D687,094 S | 7/2013 | Mullen et al. | |
| 8,485,437 B2 | 7/2013 | Mullen et al. | |
| 8,485,446 B1 | 7/2013 | Mullen et al. | |
| 8,511,574 B1 | 8/2013 | Yen et al. | |
| 8,517,276 B2 | 8/2013 | Mullen et al. | |
| 8,523,059 B1 | 9/2013 | Mullen et al. | |
| 8,561,894 B1 | 10/2013 | Mullen et al. | |
| 8,567,679 B1 | 10/2013 | Mullen et al. | |
| 8,573,503 B1 | 11/2013 | Cloutier et al. | |
| 8,579,203 B1 | 11/2013 | Lambeth et al. | |
| 8,590,796 B1 | 11/2013 | Cloutier et al. | |
| 8,602,312 B2 | 12/2013 | Cloutier et al. | |
| 8,608,083 B2 | 12/2013 | Mullen et al. | |
| 8,622,309 B1 | 1/2014 | Mullen et al. | |
| 8,628,022 B1 | 1/2014 | Rhoades et al. | |
| 8,668,143 B2 | 3/2014 | Mullen et al. | |
| 8,727,219 B1 | 5/2014 | Mullen | |
| 8,733,638 B2 | 5/2014 | Mullen et al. | |
| 8,746,579 B1 | 6/2014 | Cloutier et al. | |
| 8,757,483 B1 | 6/2014 | Mullen et al. | |
| 8,757,499 B2 | 6/2014 | Cloutier et al. | |
| 8,814,050 B1 | 8/2014 | Mullen et al. | |
| 8,827,153 B1 | 9/2014 | Rhoades et al. | |
| 8,875,999 B2 | 11/2014 | Mullen et al. | |
| 8,881,989 B2 | 11/2014 | Mullen et al. | |
| 8,888,009 B1 | 11/2014 | Mullen | |
| 8,931,703 B1 | 1/2015 | Mullen et al. | |
| 8,944,333 B1 | 2/2015 | Mullen et al. | |
| 8,960,545 B1 | 2/2015 | Batra | |
| 8,973,824 B2 | 3/2015 | Mullen et al. | |
| 9,004,368 B2 | 4/2015 | Mullen et al. | |
| 9,010,630 B2 | 4/2015 | Mullen et al. | |
| 9,053,398 B1 | 6/2015 | Cloutier | |
| 9,064,194 B1 | 6/2015 | Bohac, Jr. | |
| 9,064,255 B1 | 6/2015 | Mullen et al. | |
| 9,292,843 B1 | 3/2016 | Mullen et al. | |
| 9,306,666 B1 | 4/2016 | Zhang et al. | |
| 9,329,619 B1 | 5/2016 | Cloutier | |
| 9,349,089 B1 | 5/2016 | Rhoades et al. | |
| 9,361,569 B2 | 6/2016 | Mullen et al. | |
| 9,373,069 B2 | 6/2016 | Cloutier et al. | |
| 9,384,438 B2 | 7/2016 | Mullen et al. | |
| 9,547,816 B2 | 1/2017 | Mullen et al. | |
| 9,619,741 B1 | 4/2017 | Rigatti | |
| 9,639,796 B2 | 5/2017 | Mullen et al. | |
| 9,646,240 B1 | 5/2017 | Mullen et al. | |
| 9,652,436 B1 | 5/2017 | Yen et al. | |
| 9,684,861 B2 | 6/2017 | Mullen et al. | |
| D792,511 S | 7/2017 | Mullen et al. | |
| D792,512 S | 7/2017 | Mullen et al. | |
| D792,513 S | 7/2017 | Mullen et al. | |
| 9,697,454 B2 | 7/2017 | Mullen et al. | |
| 9,704,088 B2 | 7/2017 | Mullen et al. | |
| 9,704,089 B2 | 7/2017 | Mullen et al. | |
| 9,710,745 B1 | 7/2017 | O'Shea | |
| 9,721,201 B1 | 8/2017 | Mullen et al. | |
| 9,727,813 B2 | 8/2017 | Mullen et al. | |
| 9,734,669 B1 | 8/2017 | Mullen et al. | |
| 9,805,297 B2 | 10/2017 | Mullen et al. | |
| 9,818,125 B2 | 11/2017 | Mullen et al. | |
| 9,836,680 B1 | 12/2017 | Cloutier | |
| 9,852,368 B1 | 12/2017 | Yen et al. | |
| 9,875,437 B2 | 1/2018 | Cloutier et al. | |
| 9,881,245 B1 | 1/2018 | Rhoades et al. | |
| 9,916,992 B2 | 3/2018 | Mullen et al. | |
| 9,928,456 B1 | 3/2018 | Cloutier et al. | |
| 9,953,255 B2 | 4/2018 | Yen et al. | |
| 10,022,884 B1 | 7/2018 | Cloutier | |
| 10,032,100 B2 | 7/2018 | Mullen et al. | |
| 10,055,614 B1 | 8/2018 | Cloutier et al. | |
| 10,062,024 B1 | 8/2018 | Bohac, Jr. | |
| 10,095,970 B1 | 10/2018 | Mullen | |
| 10,095,974 B1 | 10/2018 | Mullen et al. | |
| 10,169,692 B2 | 1/2019 | Mullen et al. | |
| 10,169,693 B1 | 1/2019 | Batra | |
| 10,176,419 B1 | 1/2019 | Cloutier et al. | |
| 10,176,423 B1 | 1/2019 | Mullen et al. | |
| 10,181,097 B1 | 1/2019 | Mullen et al. | |
| 10,198,687 B2 | 2/2019 | Mullen et al. | |
| 10,223,631 B2 | 3/2019 | Mullen et al. | |
| 10,255,545 B2 | 4/2019 | Mullen et al. | |
| 10,325,199 B2 | 6/2019 | Mullen et al. | |
| 10,430,704 B2 | 10/2019 | Mullen et al. | |
| 10,467,521 B2 | 11/2019 | Mullen et al. | |
| 10,482,363 B1 | 11/2019 | Cloutier et al. | |
| 10,496,918 B2 | 12/2019 | Mullen et al. | |
| 10,504,105 B2 | 12/2019 | Mullen et al. | |
| 10,579,920 B2 | 3/2020 | Mullen et al. | |
| 10,693,263 B1 | 6/2020 | Mullen et al. | |
| 10,936,926 B1 | 3/2021 | Rhoades et al. | |
| 10,948,964 B1 | 3/2021 | Cloutier | |
| 10,997,489 B2 | 5/2021 | Mullen et al. | |
| 11,062,195 B2 | 7/2021 | Mullen | |
| 11,144,909 B1 | 10/2021 | Mullen et al. | |
| 11,238,329 B2 | 2/2022 | Mullen et al. | |
| 11,494,605 B2 | 11/2022 | Thangamani et al. | |
| 11,494,606 B2 | 11/2022 | Mullen et al. | |
| 2001/0034702 A1 | 10/2001 | Mockett et al. | |
| 2001/0047335 A1 | 11/2001 | Arndt et al. | |
| 2002/0059114 A1 | 5/2002 | Cockrill et al. | |
| 2002/0082989 A1 | 6/2002 | Fife et al. | |
| 2002/0096570 A1 | 7/2002 | Wong et al. | |
| 2002/0120583 A1 | 8/2002 | Keresman, III et al. | |
| 2003/0034388 A1 | 2/2003 | Routhenstein et al. | |
| 2003/0052168 A1 | 3/2003 | Wong | |
| 2003/0057278 A1 | 3/2003 | Wong | |
| 2003/0116635 A1 | 6/2003 | Taban | |
| 2003/0152253 A1 | 8/2003 | Wong | |
| 2003/0163287 A1 | 8/2003 | Vock et al. | |
| 2003/0173409 A1 | 9/2003 | Vogt et al. | |
| 2003/0179909 A1 | 9/2003 | Wong et al. | |
| 2003/0179910 A1 | 9/2003 | Wong | |

(56) References Cited

U.S. PATENT DOCUMENTS

| | | |
|---|---|---|
| 2003/0226899 A1 | 12/2003 | Finkelstein |
| 2004/0035942 A1 | 2/2004 | Silverman |
| 2004/0083373 A1* | 4/2004 | Perkins ................. H04L 9/3236 |
| | | 713/189 |
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sohata et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0029593 A1 | 2/2008 | Hammad et al. |
| 2008/0029607 A1 | 2/2008 | Mullen |
| 2008/0035738 A1 | 2/2008 | Mullen |
| 2008/0040271 A1 | 2/2008 | Hammad et al. |
| 2008/0040276 A1 | 2/2008 | Hammad et al. |
| 2008/0054068 A1 | 3/2008 | Mullen |
| 2008/0054079 A1 | 3/2008 | Mullen |
| 2008/0054081 A1 | 3/2008 | Mullen |
| 2008/0058016 A1 | 3/2008 | Di Maggio et al. |
| 2008/0059379 A1 | 3/2008 | Ramaci et al. |
| 2008/0065555 A1 | 3/2008 | Mullen |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302869 A1 | 12/2008 | Mullen |
| 2008/0302876 A1 | 12/2008 | Mullen |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159663 A1 | 6/2009 | Mullen et al. |
| 2009/0159667 A1 | 6/2009 | Mullen et al. |
| 2009/0159668 A1 | 6/2009 | Mullen et al. |
| 2009/0159669 A1 | 6/2009 | Mullen et al. |
| 2009/0159670 A1 | 6/2009 | Mullen et al. |
| 2009/0159671 A1 | 6/2009 | Mullen et al. |
| 2009/0159672 A1 | 6/2009 | Mullen et al. |
| 2009/0159673 A1 | 6/2009 | Mullen et al. |
| 2009/0159680 A1 | 6/2009 | Mullen et al. |
| 2009/0159681 A1 | 6/2009 | Mullen et al. |
| 2009/0159682 A1 | 6/2009 | Mullen et al. |
| 2009/0159688 A1 | 6/2009 | Mullen et al. |
| 2009/0159689 A1 | 6/2009 | Mullen et al. |
| 2009/0159690 A1 | 6/2009 | Mullen et al. |
| 2009/0159696 A1 | 6/2009 | Mullen |
| 2009/0159697 A1 | 6/2009 | Mullen et al. |
| 2009/0159698 A1 | 6/2009 | Mullen et al. |
| 2009/0159699 A1 | 6/2009 | Mullen et al. |
| 2009/0159700 A1 | 6/2009 | Mullen et al. |
| 2009/0159701 A1 | 6/2009 | Mullen et al. |
| 2009/0159702 A1 | 6/2009 | Mullen |
| 2009/0159703 A1 | 6/2009 | Mullen et al. |
| 2009/0159704 A1 | 6/2009 | Mullen et al. |
| 2009/0159705 A1 | 6/2009 | Mullen et al. |
| 2009/0159706 A1 | 6/2009 | Mullen et al. |
| 2009/0159707 A1 | 6/2009 | Mullen et al. |
| 2009/0159708 A1 | 6/2009 | Mullen et al. |
| 2009/0159709 A1 | 6/2009 | Mullen |
| 2009/0159710 A1 | 6/2009 | Mullen et al. |
| 2009/0159711 A1 | 6/2009 | Mullen et al. |
| 2009/0159712 A1 | 6/2009 | Mullen et al. |
| 2009/0159713 A1 | 6/2009 | Mullen et al. |
| 2009/0160617 A1 | 6/2009 | Mullen et al. |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2009/0308921 A1 | 12/2009 | Mullen |
| 2010/0027786 A1* | 2/2010 | Faith ..................... H04L 9/3226 |
| | | 380/28 |
| 2010/0070549 A1* | 3/2010 | Nagaraj ................... G06F 7/58 |
| | | 708/254 |
| 2011/0028184 A1 | 2/2011 | Cooper |
| 2011/0184867 A1 | 7/2011 | Varadarajan |
| 2011/0272465 A1 | 11/2011 | Mullen et al. |
| 2011/0272466 A1 | 11/2011 | Mullen et al. |
| 2011/0272467 A1 | 11/2011 | Mullen et al. |
| 2011/0272471 A1 | 11/2011 | Mullen |
| 2011/0272472 A1 | 11/2011 | Mullen |
| 2011/0272473 A1 | 11/2011 | Mullen et al. |
| 2011/0272474 A1 | 11/2011 | Mullen et al. |
| 2011/0272475 A1 | 11/2011 | Mullen et al. |
| 2011/0272476 A1 | 11/2011 | Mullen et al. |
| 2011/0272477 A1 | 11/2011 | Mullen et al. |
| 2011/0272478 A1 | 11/2011 | Mullen |
| 2011/0272479 A1 | 11/2011 | Mullen |
| 2011/0272480 A1 | 11/2011 | Mullen et al. |
| 2011/0272481 A1 | 11/2011 | Mullen et al. |
| 2011/0272482 A1 | 11/2011 | Mullen et al. |
| 2011/0272483 A1 | 11/2011 | Mullen et al. |
| 2011/0272484 A1 | 11/2011 | Mullen et al. |
| 2011/0276380 A1 | 11/2011 | Mullen et al. |
| 2011/0276381 A1 | 11/2011 | Mullen et al. |
| 2011/0276416 A1 | 11/2011 | Mullen et al. |
| 2011/0276424 A1 | 11/2011 | Mullen |
| 2011/0276425 A1 | 11/2011 | Mullen |
| 2011/0276436 A1 | 11/2011 | Mullen et al. |
| 2011/0276437 A1 | 11/2011 | Mullen et al. |
| 2011/0278364 A1 | 11/2011 | Mullen et al. |
| 2011/0282753 A1 | 11/2011 | Mullen et al. |
| 2011/0284632 A1 | 11/2011 | Mullen et al. |
| 2011/0284640 A1 | 11/2011 | Mullen et al. |
| 2012/0028702 A1 | 2/2012 | Mullen et al. |
| 2012/0037709 A1 | 2/2012 | Cloutier et al. |
| 2012/0059762 A1 | 3/2012 | Muscato |
| 2012/0159591 A1* | 6/2012 | Payne ..................... G06F 21/35 |
| | | 726/7 |
| 2012/0197708 A1 | 8/2012 | Mullen et al. |
| 2012/0209744 A1 | 8/2012 | Mullen et al. |

(56) References Cited

U.S. PATENT DOCUMENTS

| | | |
|---|---|---|
| 2012/0254037 A1 | 10/2012 | Mullen |
| 2012/0254038 A1 | 10/2012 | Mullen |
| 2012/0286037 A1 | 11/2012 | Mullen et al. |
| 2012/0286928 A1 | 11/2012 | Mullen et al. |
| 2012/0286936 A1 | 11/2012 | Mullen et al. |
| 2012/0290449 A1 | 11/2012 | Mullen et al. |
| 2012/0290472 A1 | 11/2012 | Mullen et al. |
| 2012/0318871 A1 | 12/2012 | Mullen et al. |
| 2012/0326013 A1 | 12/2012 | Cloutier et al. |
| 2013/0020396 A1 | 1/2013 | Mullen et al. |
| 2013/0217152 A1 | 8/2013 | Mullen et al. |
| 2013/0227661 A1* | 8/2013 | Gupta ............... G06F 21/31 726/6 |
| 2013/0282573 A1 | 10/2013 | Mullen et al. |
| 2013/0282575 A1 | 10/2013 | Mullen et al. |
| 2014/0054384 A1 | 2/2014 | Cloutier et al. |
| 2015/0186766 A1 | 7/2015 | Mullen et al. |
| 2016/0162713 A1 | 6/2016 | Cloutier et al. |
| 2016/0180209 A1 | 6/2016 | Mullen et al. |
| 2016/0239735 A1 | 8/2016 | Mullen et al. |
| 2016/0283837 A1 | 9/2016 | Mullen et al. |
| 2016/0307085 A1 | 10/2016 | Mullen et al. |
| 2016/0335529 A1 | 11/2016 | Mullen et al. |
| 2016/0342876 A1 | 11/2016 | Mullen et al. |
| 2016/0342877 A1 | 11/2016 | Mullen et al. |
| 2016/0342878 A1 | 11/2016 | Mullen et al. |
| 2016/0342879 A1 | 11/2016 | Mullen et al. |
| 2016/0342880 A1 | 11/2016 | Mullen et al. |
| 2017/0286817 A1 | 10/2017 | Mullen et al. |
| 2017/0300796 A1 | 10/2017 | Mullen et al. |
| 2018/0053079 A1 | 2/2018 | Cloutier et al. |
| 2018/0060881 A1 | 3/2018 | Mullen et al. |
| 2018/0151391 A1 | 5/2018 | Mullen et al. |
| 2019/0026613 A1 | 1/2019 | O'Shea |
| 2019/0042903 A1 | 2/2019 | Cloutier et al. |
| 2019/0065928 A1 | 2/2019 | Mullen et al. |
| 2019/0197387 A1 | 6/2019 | Mullen et al. |
| 2019/0340484 A1 | 11/2019 | Mullen et al. |
| 2020/0082383 A1 | 3/2020 | Mullen et al. |
| 2022/0172020 A1 | 6/2022 | Mullen et al. |

FOREIGN PATENT DOCUMENTS

| | | |
|---|---|---|
| WO | WO0247019 | 6/2002 |
| WO | WO06066322 | 6/2006 |
| WO | WO06080929 | 8/2006 |
| WO | WO06105092 | 10/2006 |
| WO | WO06116772 | 11/2006 |
| WO | WO08064403 | 6/2008 |

OTHER PUBLICATIONS

U.S. Appl. No. 60/594,300, Poidomani et al.
U.S. Appl. No. 60/675,388, Poidomani et al.
The Bank Credit Card Business. Second Edition, American Bankers Association, Washington, D.C., 1996.
A Day in the Life of a Flux Reversal. http://www.phrack/org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.

* cited by examiner

CARDS, DEVICES, SYSTEMS, METHODS AND DYNAMIC SECURITY CODES

CROSS-REFERENCE TO RELATED APPLICATION

This application claims the benefit of U.S. Provisional Patent Application No. 61/647,112, titled "CARDS, DEVICES, SYSTEMS, METHODS AND DYNAMIC SECURITY CODES," filed May 15, 2012, which is hereby incorporated by reference herein in its entirety.

BACKGROUND OF THE INVENTION

Example embodiments relate to magnetic cards, devices and transaction systems.

SUMMARY OF THE INVENTION

Systems and methods may be provided for securely processing a transaction and/or a payment of goods with a payment card or other device (e.g., a mobile telephonic device, a tablet computer device, or another electronic device), and facilitating a user's selection of an additional service to be performed. A card, or other device, may include one or more buttons. A user may associate an additional feature to a button of a card at any time. A user may also associate an additional feature to a type of transaction (e.g., a sale by a user) at any time. At the time of purchase, information indicative of a dynamic security code, the type of transaction and/or the button the user selected may be passed to a point-of-sale system as part of discretionary data, along with a user's payment information. Such data may be, for example, communicated through a merchant acquirer's network to a processing facility.

The processing facility may, for example, authorize a payment transaction (e.g., using the dynamic security code) and forward the information indicative of the type of transaction, the button a user selected and/or the identity of the user to a remote facility. The remote facility may be maintained by, for example, an ecosystem provider that provides an ecosystem associating payment cards, transaction types and applications, and facilitates the provision of features to users of the ecosystem. The remote facility may forward some/all of such information, and/or data based on such information, as well as additional information, to an application provider (e.g., a third party service provider) such that the application provider may enact an additional feature desired by the user.

An additional feature may include, for example, a game action in an online game by a game service provider, a check-in to a location by a check-in service provider, a coupon or voucher provided by a third party coupon provider, loyalty points provided by a third party loyalty service, an opportunity to rate a transaction or location provided by a rating service, any combination of such features, and/or any additional feature.

Selection of a feature may be provided, for example, by a Graphical User Interface (GUI) provided on a computing device (e.g., a mobile telephonic device) as a software application for that device or via the internet or an intranet through a web browser. Selection of a feature may be performed using, for example, an application manager provided by an application manger provider (that may be the same or different from an ecosystem provider). The application manager may be displayed via the GUI.

Users may access an application manager via, for example, a website of the application manager provider and/or an issuer. The website may be accessed via, for example, a desktop and/or mobile browser. The user may use the application manager to manage features. For example, the user may activate applications, deactivate applications, assign applications to specific buttons (e.g., card buttons), assign applications to specific types of transactions, change application settings and/or view information with respect to individual applications via an application manager GUI.

Accordingly, for example, a user may receive a payment method compatible with the ecosystem (e.g., a powered card, or other device) in the mail and use his/her web browser to associate different additional features to different buttons. The user may then utilize the card in a store and press a button in order to select that feature. A card, or other device, may download information (e.g., via a wireless communication such as a light or electromagnetic communication) such that the card, or other device, displays information next to an option indicative of the feature (e.g., "Redeem LivingSocial Voucher," "Facebook Like"). According to some example embodiments, no download may be provided and no additional information may be displayed such that a user's card, or other device, includes a generic descriptor (e.g., "credit" and "feature," or "feature 1" and "feature 2," or "debit" and "feature 1" and "feature 2").

A facility such as a facility provided by an ecosystem provider may also receive information in addition to a dynamic security code, user identifier, a type of transaction and information indicative of the option selected by a user (or that the user made a payment). Such additional information may be, for example, the type of merchant (e.g., a retail merchant or a gas merchant), the location of a merchant (e.g., the zip code of a merchant), the origin of the transaction (e.g., online or in-store purchase), the name of the merchant (e.g., "Amazon.com," or "Walmart"), the amount of the transaction (e.g., $10.25), identification of the commodities (e.g., services, goods, and/or the like) exchanged in the transaction, and any other information. Such a facility may forward such information to an application provider (e.g., third party service provider) in addition to information generated by the facility (e.g., a second user identifier such that different identifiers are used with the facility sending payment information and the application provider).

An application provider may communicate information to an ecosystem provider. Information received from an application provider may include, for example, information indicative that the user was properly identified and a service was performed. Such information may be provided back to an issuing bank, processor, and/or other service provider such that the information may be displayed on a user's bill statement. Additional information may also be provided that may change the way a transaction is authorized or settled.

Information indicative of a button press, a type of transaction and/or the use of a card, that triggers a feature, may be provided in and/or with a payment message utilized at authorization or at settlement. Furthermore, the service provider may return information in a period of time that permits actions to be performed pre-authorization or pre-settlement.

The payment actions may be determined, for example, via a user interaction with the card and/or use of a card reader. For example, a user may press a button on the card, from a group of buttons, that is associated with the application provider feature and/or use a card reader associated with the application provider feature. Accordingly, a user may obtain the benefit of the whimsical and festive nature of a unique feature every time the user makes or accepts a payment.

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, LED, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less acceptable to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively.

A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that such a processor is not exposed on the surface of the card.

A card may be provided with a button in which the activation of the button causes a code to be communicated through a dynamic magnetic stripe communications device (e.g., the next time a read-head detector on the card detects a read-head). The code may be indicative of, for example, a feature (e.g., a payment feature). The code may be received by the card via manual input (e.g., onto buttons of the card) or via a wireless communication (e.g., via light, electromagnetic communications, sound, or other wireless signals). A code may be communicated from a webpage (e.g., via light and/or sound) to a card. A card may include a display such that a received code may be visually displayed to a user. In doing so, the user may be provided with a way to select, and use, the code via both an in-store setting (e.g., via a magnetic stripe reader) or an online setting (e.g., by reading the code from a display and entering the code into a text box on a checkout page of an online purchase transaction).

A processing server, such as a payment authorization server, may receive the code and may process a payment differently based on the code received. For example, a code may be a security code to authorize a purchase transaction. A code may provide a payment feature such that a purchase may be made with points, debit, credit, installment payments, or deferred payments via a single payment account number (e.g., a credit card number) to identify a user and a payment feature code to select the type of payment a user desires to utilize.

A dynamic magnetic stripe communications device may include a magnetic emulator that comprises an inductor (e.g., a coil). Current may be provided through this coil to create an electromagnetic field operable to communicate with the read-head of a magnetic stripe reader. The drive circuit may fluctuate the amount of current travelling through the coil such that a track of magnetic stripe data may be communicated to a read-head of a magnetic stripe reader. A switch (e.g., a transistor) may be provided to enable or disable the flow of current according to, for example, a frequency/double-frequency (F2F) encoding algorithm. In doing so, bits of data may be communicated.

Electronics may be embedded between two layers of a polymer (e.g., a PVC or non-PVC polymer). One or more liquid polymers may be provided between these two layers. The liquid polymer(s) may, for example, be hardened via a reaction between the polymers (or other material), temperature, or via light (e.g., an ultraviolet or blue spectrum light) such that the electronics become embedded between the two layers of the polymer and a card is formed.

A payment card or other device may receive information indicative of a feature desired to be added by a user. The payment card may communicate information indicative of the feature with payment card data associated with the card or a user selection. The payment data and feature information may be routed, for example, to an authorization server. The authorization server may authorize payment and, based on the authorized payment, communicate the feature information to a remote server. The remote server may utilize this remote information to impact an application provider service. The feature information may, for example, be routed before the payment card data reaches an authorization server. At merchant settlement, charge backs for a purchase associated with a feature may cause the feature to be reversed or a different feature to be implemented (e.g., a removal of rewards earned at authorization). The feature may be implemented at settlement upon confirmation that, for example, no chargeback was associated with the payment transaction.

A powered and/or device card may be provided with a visible number that changes periodically or changes after each use. The number may be, for example, an account number, a CVV and/or a CID. For dynamic credit cards that employ periodically changing numbers, a timing signal may be used. For example, a signal representative of time may be transmitted over an area (e.g., the United States). Such a timing signal may be the U.S. atomic clock signal (e.g., the WWVB signal), a European timing signal (e.g., the DCF and MSF signals), or a timing signal used in a locating/navigation system (e.g., a GPS signal).

A powered card and/or device card may have a number that is secure to the user. This secure number may then be coded in a variety of ways. For example, the number may be coded utilizing a counter, timer, random number generator, or pseudorandom number generator to provide a coded number. If a counter is provided, the counter may be incremented periodically (or when the credit card is used).

The counter may be utilized in a coding function and this number may also be transmitted to a authorization facility when the dynamic credit card number is transmitted to the authorization facility.

A three or four digit card verification code may be submitted as part of a credit card authorization process. Such a security code may be dynamic and may be utilized to validate a transaction. A dynamic security code may be provided on a display screen separate from the dynamic credit card number or the dynamic security code may be provided on the same display screen as the dynamic card number. According to some example embodiments, a dynamic card may be provided with a dynamic security code and a static credit card number such that only the dynamic security code changes. Such embodiments may, or may not, include an encoder. Thus, a credit card may be provided that includes a dynamic security code. The dynamic security code may change based on a random number generator and a credit card authorization facility may check to make sure the dynamic security code is valid. A dynamic security code may be validated by comparing the dynamic security code and a verification code.

Methods may be employed to generate dynamic security codes at a point-of-sale (e.g., by a card and/or device) and verification codes at a point-of-validation (e.g., by an authorization server), such that no synchronicity is required between the point-of-sale and the validation device. For example, a dynamic code may be generated using a random number and a function. The dynamic code, the random number and an identifier may be communicated to a validation entity. The validation entity may determine the function associated to the card/device used at the point-of-sale based on the identifier (e.g., retrieved from secure storage at the validation entity) and generate a verification code using the random number communicated by the card/device. The dynamic security code and the verification code may be compared to determine if the dynamic security code is valid.

The function used by the card/device and/or validation entity to generate a dynamic code may not be stored for each account and may be derived using a function determination number associated to card accounts. For example, an issuer may securely store function determination numbers (e.g., for each account), base variables (e.g., base variables common to all accounts) and a table (e.g., a global table common to all accounts). The function determination number may be used to look up exponent values and operators (e.g., addition, subtraction and/or the like) in a look-up-table (LUT). The base variables, the exponent values and the operators may be combined (e.g., in a defined manner) to produce a polynomial function used to generate a dynamic number. The base variables may be, for example, a base function for which at least some of the base variables may be replaced by the exponents and operators, and some may be replaced by portions of the random number (e.g., individual digits).

Upon issuance of an account, a powered card and/or device (e.g., including a device card) may be configured to include the function determination number associated to the account holder, the LUT, the base variables and a random number generator (or the function and the random number generator). The function may be determined for each transaction, upon initialization of the powered card and/or device, and/or at some other point. Using the configured powered card and/or device, a user may initiate a transaction. The powered card and/or device may generate a random number and compute a solution to the function. The solution may be the dynamic security code.

The dynamic security code and the random number may be communicated to a validation entity (e.g., the issuer and/or a card authorization facility) along with other transactional data. The card validation entity may extract an identifier (e.g., a credit card number, a user name and/or the like) from the transactional data. The validation entity may use the transactional data to retrieve the function determination number associated with the account from secure storage and determine the polynomial function associated to the account. The validation entity may compute a solution to the function using the random number received from the powered and/or device card. The computed solution may be a verification code. The verification code may be compared to the dynamic security code received from the powered and/or device card (or received from an online site, via telecommunications and/or the like).

If the verification code matches the dynamic security code, the dynamic security code may be validated. Accordingly, a dynamic security code may be used to reduce unauthorized transactions without synchronicity between the validating entity and a powered and/or device card. Use of a function determination number, a LUT and base variables may reduce an amount of information that is stored by a validating entity (e.g., a 5 digit function determination number stored for each account instead of an entire polynomial function). Communications using the dynamic security code may be one way communications (e.g., from a powered card to a validation entity).

BRIEF DESCRIPTION OF THE DRAWINGS

Principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
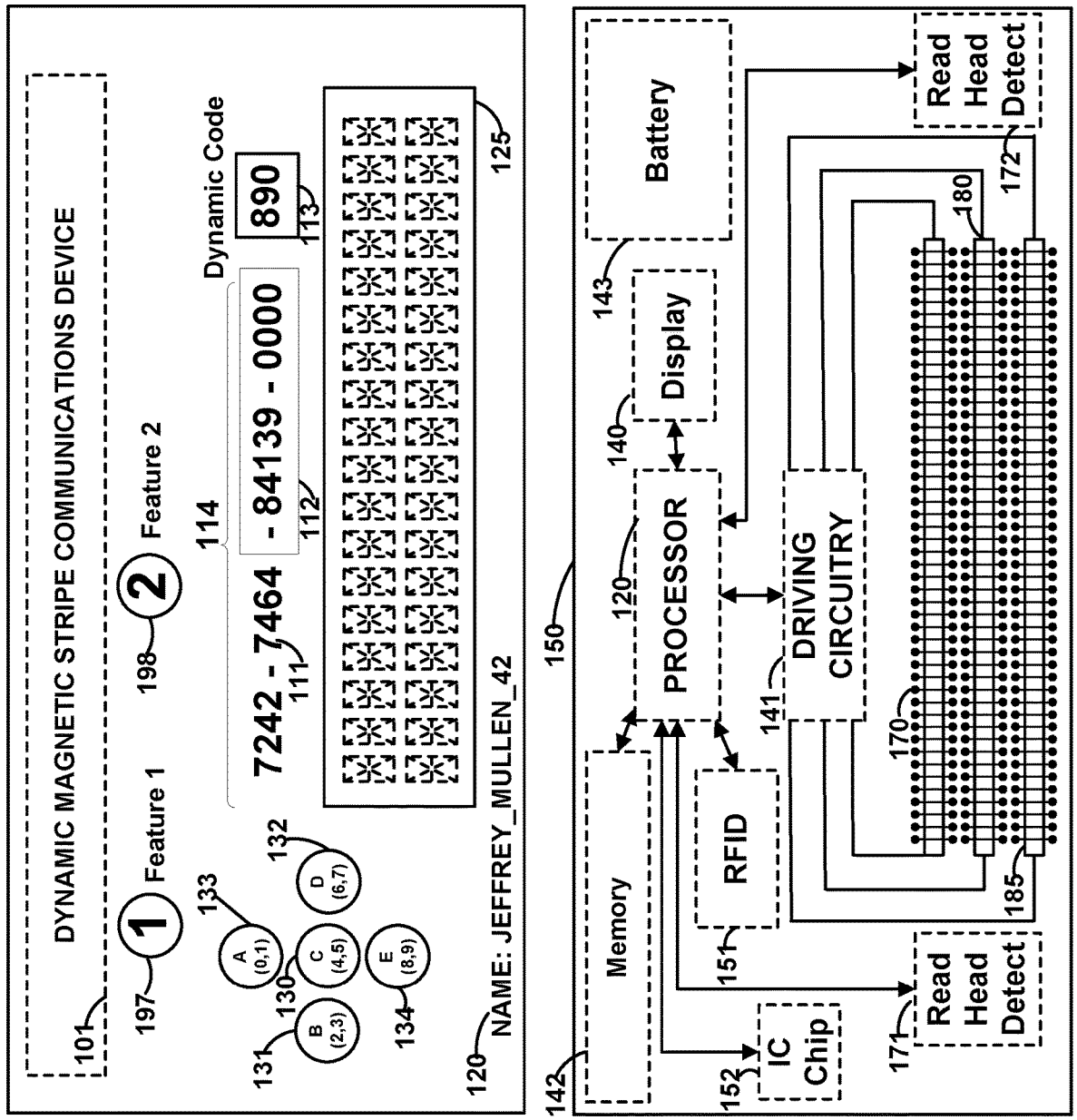
FIG. 1 shows cards and architectures constructed in accordance with the principles of the present invention.

FIG. 1 shows cards and architectures according to example embodiments. Referring to FIG. 1, card 100 may include, for example, dynamic magnetic stripe communications device 101, one or more displays (e.g., displays 112, 113 and 125), permanent information 120, one or more buttons (e.g., buttons 130-134, 197 and 198) and/or dynamic number 114. Dynamic number 114 may include permanent portion 111. Permanent portion 111 may be, for example, printed, embossed and/or laser etched on card 100.

Multiple displays may be provided on card 100 for various purposes. For example, display 112 may utilized to entirely, and/or partially display a dynamic number. Display 113 may be utilized to display a dynamic code (e.g., a dynamic security code). Display 125 may display logos, barcodes and/or multiple lines of information. At least one of displays 112, 113 and 125 may be a bi-stable or non bi-stable display. A bi-stable display may be a display that maintains an image without power.

Permanent information 120 may include, for example, information specific to a user (e.g., a user's name and/or username) and/or information specific to a card (e.g., a card issue date and/or a card expiration date).

Buttons 131-134, 197 and 198 may be mechanical buttons, capacitive buttons, or a combination of mechanical and capacitive buttons. Buttons 131-134 may be used, for example, to enter information (e.g., an access code) and/or to make a selection. For example, using buttons 131-134, a user may select options displayed on display 125 that instruct card 100 to communicate (e.g., via a dynamic magnetic stripe communications device, RFID and/or exposed IC chip) a user's instructions to use a debit account, a credit account, a pre-paid account, and/or a point account for a transaction (e.g., a payment transaction). According to at least one example embodiment, more than one account may be selected. For example, a transaction may be divided between accounts and card 100 may be utilized to indicate a user's desire to use a point account until the point account is exhausted and then to use a credit account.

Button 197 may be used, for example, to communicate information through dynamic magnetic stripe communications device 101 indicative of a user's desire to communicate a single track of magnetic stripe information. Persons skilled in the art will appreciate that pressing a button (e.g., button 197) may cause information to be communicated through device 101 when an associated read-head detector detects the presence of a read-head of a magnetic stripe reader. Button 198 may be utilized to communicate (e.g., after button 198 is pressed and after a read-head detects a read-head of a reader) information indicative of a user selection (e.g., to communicate two or more tracks of magnetic stripe data, to communicate different track data, to modify tracks of data and/or the like).

Button 197 and button 198 may each be used to associate a feature to a transaction. For example, button 197 and button 198 may be associated to different service provider applications. Each service provider application may be associated to a different service provider feature (e.g., rewards). A user may, for example, press one or more of buttons 197 and 198 to choose one or more features for a particular transaction.

A user may associate applications to buttons and/or features to applications, for example, on a graphical user interface (GUI). The graphical user interface may be, for example, an application manager provided by one or more entities (e.g., an application manager provider). The associations may be changed, for example, at any time, periodically, and/or upon the occurrence of an event. According to some example embodiments, a user may associate applications to buttons and/or features to applications by telephone, by electronic mail and/or any other communication method.

Associations between buttons and service provider applications may be maintained by an ecosystem provider, for example, within an ecosystem of applications, transactional methods and types of transactions. When a transactional method (e.g., card 100) is used by a user, the ecosystem provider may receive transactional data and information indicative of a button selected by the user. The ecosystem provider may determine the identity of an application associated to the button, and may communicate some or all of the information and/or transactional data to the application and/or the service provider. The service provider and/or the application may provide a feature associated with the application based on the information and/or transactional data.

Different features may be provided based on the use of different transactional methods and/or transaction types. For example, suppose a service provider provides a reward feature based on the use of a particular payment method (e.g., a reward for using a particular credit card). A user may purchase an item using the particular payment method (e.g., may select a particular credit account using buttons 130-134 and display 125). When the purchase is performed, the reward may be communicated to the user. As another example, suppose a service provider provides a reward feature based on a type of transaction. For example, a reward may be provided for a sale of a commodity using a particular transaction processor (e.g., issuer, acquirer and/or payment network). A user may sell a commodity using the particular transaction processor (e.g., the ecosystem provider) and upon completion of the sale a reward may be communicated to the user.

Selection of a feature may or may not have a cost associated with it. If a cost is associated with the feature, for example, the cost may be added to a customer's statement (e.g., added to a credit or debit purchase) for a particular transaction. A fixed-fee and/or variable-fee (e.g., a percentage of the transaction) may then be removed from the fee charged to the user and distributed among particular parties, for example, distributed among a card issuer, application manager provider, ecosystem provider, device provider, service provider and/or one or more other entities. Persons skilled in the art in possession of example embodiments will appreciate that many different fee arrangements are possible, and that the various providers may be the same and/or different from each other.

A cost may be associated to a feature selection, but may not be a cost to a user. For example, the cost may be a cost to a service provider (e.g., a third party service provider). The cost may be provided to other entities, for example, the device provider, card issuer, card processor, and/or any other entity (e.g., a card network).

Display 112 may display a dynamic number, for example, all or a portion of an account number (e.g., a credit and/or debit account number). Display 113 may display, for example, a dynamic verification code (e.g., a card verification value (CVV) and/or card identification number (CID)). The dynamic numbers displayed on displays 112 and 113 may change according to various schemes as a security measure against fraudulent transactions. For example, the dynamic numbers may change periodically and/or upon the occurrence of an event such that a previously recorded number may become unusable.

Card 100 and/or a user may communicate a dynamic number to a processing facility. The processing facility may validate the dynamic number (e.g., a dynamic credit card number and/or a dynamic security code). A user may purchase items using a dynamic card and a processing facility may authorize the purchases upon determining that the dynamic number is valid.

Although example embodiments may be described with respect to numbers, the scope of example embodiments includes any distinguishing representation of a security code and/or account, by any sensory method (e.g., sight, sound, touch and/or the like). Characters, images, sounds, textures, letters and/or any other distinguishable representations are contemplated by example embodiments.

Generation of a dynamic number and the functionality needed to verify the dynamic number at a processing/authorization facility may be accomplished in a variety of ways. For example, a private key (or equation, hash table function and/or the like) and a secure card number (e.g., a private number) may be known to both the dynamic card (e.g., stored in memory 142 of a card 100) and the processing/authorization facility. A signal may be received or generated by the dynamic card (e.g., a counter signal, a randomly generated signal, a timing signal, etc.) and the dynamic card may produce a dynamic number based on the signal, the private key and/or the private card number. The processing facility may utilize the private key, private card number, the dynamic number, and/or the signal (or a different signal synchronized with the signal) to verify that the dynamic number is correct.

As one non-limiting example, a processing facility may receive a time stamp with a dynamic number and any other information received from a dynamic card (e.g., account identification information and expiration date). The processing facility may use the time stamp, the received dynamic card information (and any other received information), the private key, and the private number to verify that the dynamic number is correct for that period of time (or a string of consecutive periods of time that include, and are located near, the time stamp). A time stamp may be utilized, for example, to authorize online purchases and/or telephonic purchases that are not immediately processed. A time stamp may be indicative of, for example, a particular time or period of time. According to at least one example embodiment, a timing may be independently determined by a dynamic card and a processing facility (e.g., using a same time source and/or synchronized timing sources) and a time stamp may not be communicated.

Persons skilled in the art will appreciate that a dynamic card number may be produced without the need for a private number such as a private credit card number or security code, for example, a number stored in both a credit card and a remote facility. For example, a timing signal may be encoded based on the private key (or equation) and the resultant encoded number utilized as a dynamic credit card number. According to at least one example embodiment, a timing signal may be coded using a private credit card number.

A private key may be an equation or formula that uses one or more other variables (e.g., a random number) to generate a coded number (e.g., a dynamic number). Persons skilled in the art will appreciate that one or more private keys (e.g., an equation or formula) may be utilized to code different numbers for a dynamic card. For example, one private key may be utilized to code a dynamic card number while another private key may be utilized to code a dynamic security code (e.g., a verification code).

A number of private keys (and/or private numbers) may be stored in a credit card and such private keys (and/or private numbers) may be changed periodically (e.g., every day or week). A similar number of private keys (and/or private numbers) may be stored in a remote facility (e.g., a remote server), the selection of which may be determined by a particular time (e.g., a particular day or a particular week). A processing/authorization facility, or any device/facility, may receive the dynamic card number and decode the dynamic number based on a replica of the private key and/or private number of the card that is stored at, or accessible by, the facility (e.g., stored on a database and/or server).

Persons skilled in the art in possession of example embodiments will appreciate that synchronization between a card and a processing facility may not be required. For example, a counter on card 100 may increment each time card 100 is used. If information does not reach a processing facility a counter used by the processing facility may not also increment. The processing facility may authorize dynamic numbers that are valid within a range to avoid declining transactions that are otherwise valid (e.g., non-fraudulent). For example, if a dynamic number is recognized for another value of a counter within a range (e.g., within 10 increments of the counter from the value of the counter at the processing facility), the processing facility may authorize a transaction and set the counter at the processing facility to match the expected counter value at card 100. An algorithm and/or transaction history may be maintained to determine if non-synchronized validations exceed an expected error level. If the error level is exceeded, transactions may be declined.

For example, a card may, at the push of a button on a dynamic card, generate a new number (e.g., from a list of stored numbers). A remote facility may determine if the button was pressed on the dynamic card by determining if a future dynamic number is valid and, if a future number is valid, the remote facility may invalidate all numbers located before the newly validated number. At the next transaction, the dynamic facility may, for example, attempt to validate the received number with the number located after the newly validated number. A table may store, for example, a dynamic number and a pointer to the next entry. A processor may read a dynamic number and utilize the pointer to determine the location of the next dynamic number. Persons of ordinary skill in the art will appreciate that similar strategies may be used for schemes employing a timing signal and/or the like.

A remote processing/authorization facility may, for example, perform the same process as the dynamic card and compare the facility's dynamic number with the received dynamic number for verification. For example, a remote facility may include any equations and variables needed by the dynamic card to generate a dynamic number and may perform an operation similar to the one performed by the dynamic card to generate its own dynamic number. The remote facility may then compare the received dynamic number to the generated dynamic number to determine if the two numbers are the same and/or within an expected degree of similarity.

A remote processing/authorization facility may decode a dynamic number using an equation and/or a private key (which may be an equation itself or a variable) to obtain a resultant number and compare this number against a private number for approval. If the decoded number matches the private number (which may, or may not, be the same private number stored in the credit card), then the dynamic number may be validated.

A dynamic card may be utilized using traditional infrastructure and may be utilized for online (or telephonic) purchases and purchases that require the card to be swiped (or entered manually into a credit card reader). A dynamic number may be decoded at any point in a validation/authorization process. For example, an online store may include the components (e.g., hardware and/or software) necessary to decode the dynamic number such that a decoded number (e.g., a credit/debit card number) may be transmitted to a card processing facility.

A processing facility, or any device decoding a number, may utilize an identification number to identify the account/card that produced the dynamic number. The identification number may then be utilized to look up, for example, the private key and/or private number of the account/card such that a dynamic number can be generated from the retrieved information (and compared to the received dynamic number) and/or the retrieved information can be utilized to decode the dynamic number such that the card may be validated and/or a transaction authorized. Multiple users may utilize the same dynamic number at any one time and the identity of the account/card can still be determined (e.g., by using the identification information).

Identification information may be utilized to identify a credit card. Multiple users may be utilizing the same dynamic number (e.g., a dynamic credit card number or a dynamic verification code) at any time. The identification information may be utilized to identify a credit card such that a dynamic number can be, for example, retrieved/generated for a particular period of time (and/or a particular transaction) for the identified credit card and compared to the received dynamic number.

The dynamic card number may be transformed into a particular credit card format so that a dynamic number may be verified as having the appropriate format before, for example, the number is transmitted to a credit card processing/authorization facility. For example, a coding equation may be utilized that always produces numbers that fit a particular format.

A dynamic card system may allow multiple users to have the same dynamic number at any particular time. Additional information may be transmitted to identify the user. For example, an account number and/or name may be utilized. According to at least one example embodiment, a traditional credit card number may be written on a traditional magnetic stripe. Such a credit card number may be used for identifying the user. A dynamic security code (e.g., a four digit security code such as a verification code) may then be provided that changes periodically. Such dynamic information (e.g., the dynamic security code) may be written to a portion of the magnetic stripe that does not have the traditional credit card number and/or the dynamic information (e.g., the dynamic security code) may be displayed to a user.

A signal may be utilized to produce a key that is used in an equation to manipulate a credit card number. The signal may be a timing signal, a counter signal, a random number generator signal (e.g., that operates similar to a random number generator in a processing facility) and/or the like. Such a counter number (or random number) may be provided to a processing facility so that the processing facility may decode (or perform the same function as the dynamic card and compare the results). A credit card number may be invalidated at the facility if, for example, any particular number is used more than a particular number of times (e.g., more than 10 times). Such a counter may be increased after every purchase (e.g., after a user presses a button to change the number). As per another example, if a counter is used and the counter is increased when a number is used (or the credit card believes that a number has been used), the number of transactions operable of being made may be limited by the storage capacity of the counter.

According to example embodiments, a method of authorizing transactions using a dynamic number may not be subject to synchronicity. For example, according to at least one example embodiment, an issuer may associate a function composed of multiple variables to each transaction account (e.g., to each credit card account), and may issue card 100 to a user with the associated function and a random number generator (e.g., a computational or physical device). A random number generated by the random number generator may define each variable of the function. For each transaction, card 100 may generate a random number and determine a solution to the associated function using the random number to generate a dynamic number. Card 100 may communicate the random number, the dynamic number and an identifier, to a verification facility and/or device (hereinafter, "verifying entity"). The verifying entity may retrieve the function associated to card 100 from secure storage based on the identifier and/or may determine the function using the identifier. A solution to the retrieved/determined function may be calculated using the random number communicated by card 100 to generate a verification number. The verifying entity may determine whether or not the verification number matches the communicated dynamic number. A transaction may be authorized if, for example, a match is determined.

According to example embodiments, a function associated with an account need not be stored by card 100 and/or a verifying entity. For example, each account may be associated to a function determination value and a (same) base set of variables. The function determination value may identify operators and/or exponents of a function including the base variables. Each associated function may be completely determined for each transaction using the operators, exponents and base variables. If the function determination value is, as one non-limiting example, a 5 digit number in a decimal numeral system defining 3 different operators, a total of about 2700 different functions may be determinable.

According to example embodiments, an identifier communicated by card 100 to a processing facility may be a function determination value and/or may be information used by a processing facility to determine/retrieve the function determination value.

Architecture 150 may be utilized with any card (e.g., any card 100). Architecture 150 may include, for example, processor 120, display 140, driving circuitry 141, memory 142, battery 143, radio frequency identification (RFID) 151, integrated circuit (IC) chip 152, electromagnetic field generators 170, 180, and 185, and read-head detectors 171 and 172.

Processor 120 may be any type of processing device, for example, a central processing unit (CPU) and/or a digital signal processor (DSP). Processor 120 may be, for example, an application specific integrated circuit (ASIC). Processor 120 may include on-board memory for storing information (e.g., drive code). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120.

Memory 142 may be coupled to processor 120. Memory 142 may store data, for example, data that is unique to a particular card. Memory 142 may store any type of data. For example, memory 142 may store, for example, a function, base variables and/or a function determination value used to generate a dynamic number. As another example, memory 142 may store discretionary data codes associated with buttons of card 100. Discretionary data codes may be recognized by remote servers to effect particular actions. For example, a discretionary data code may be stored in memory 142 and may be used to cause a third party service feature to be performed by a remote server (e.g., a remote server coupled to a third party service such as an online voucher and/or coupon provider).

Different third party features may be, for example, associated with different buttons and a particular feature may be selected by pressing an associated button. According to some example embodiments, a user may select a third party feature from a list displayed to the user. For example, the user may scroll through a list of features on a display (e.g., a display on the front of the card). A user may scroll through a list using buttons on card 100. The list of features may be displayed to the user individually (e.g., one or more buttons may be used to change which feature is displayed), in groups and/or all features may be simultaneously displayed.

According to at least one example embodiment, a user may select a type of payment on card 100 via manual input interfaces. The manual input interfaces may correspond to displayed options (e.g., displayed on display 125) and/or may be independent buttons. Selected information may be communicated to a magnetic stripe reader via a dynamic magnetic stripe communications device. Selected information may also be communicated to a device (e.g., a mobile telephonic device) including a capacitive sensor and/or other type of touch sensitive sensor.

Architecture 150 may include any number of reader communication devices. For example, architecture 150 may include at least one of IC chip 152, RFID 151 and a magnetic stripe communications device. IC chip 152 may be used to communicate information to an IC chip reader (not illustrated). IC chip 152 may be, for example, an EMV chip. RFID 151 may be used to communicate information to an RFID reader. RFID 151 may be, for example, a RFID tag. A magnetic stripe communications device may be included to communicate information to a magnetic stripe reader. For example, a magnetic stripe communications device may provide electromagnetic signals to a magnetic stripe reader.

Different electromagnetic signals may be communicated to a magnetic stripe reader to provide different tracks of data. For example, architecture 150 may include electromagnetic field generators 170, 180 and 185 to communicate separate tracks of information to a magnetic stripe reader. Electromagnetic field generators 170, 180, and 185 may include a coil (e.g., each may include a coil) wrapped around one or more materials (e.g., a soft-magnetic material and a non-magnetic material). Each electromagnetic field generator may communicate information, for example, serially and/or in parallel to a receiver of a magnetic stripe reader for particular magnetic stripe track.

Architecture 150 may include read head detectors 171 and 172. Read-head detectors 171 and 172 may be configured to sense the presence of a magnetic stripe reader (e.g., a read-head housing of a magnetic stripe reader). Information sensed by the read-head detectors 171 and 172 may be communicated to processor 120 to cause processor 120 to communicate information serially from electromagnetic generators 170, 180, and 185 to magnetic stripe track receivers in a read-head housing of a magnetic stripe reader.

According to at least one example embodiment, a magnetic stripe communications device may change the information communicated to a magnetic stripe reader at any time. Processor 120 may, for example, communicate user-specific and card-specific information through RFID 151, IC chip 152, and/or electromagnetic generators 170, 180, and 185 to card readers coupled to remote information processing servers (e.g., purchase authorization servers). Driving circuitry 141 may be utilized by processor 120, for example, to control electromagnetic generators 170, 180 and 185.

Architecture 150 may include, for example, a light sensor (not illustrated). Architecture 150 may receive information from a light sensor. Processor 120 may determine information received by a light sensor.

Figure 2:
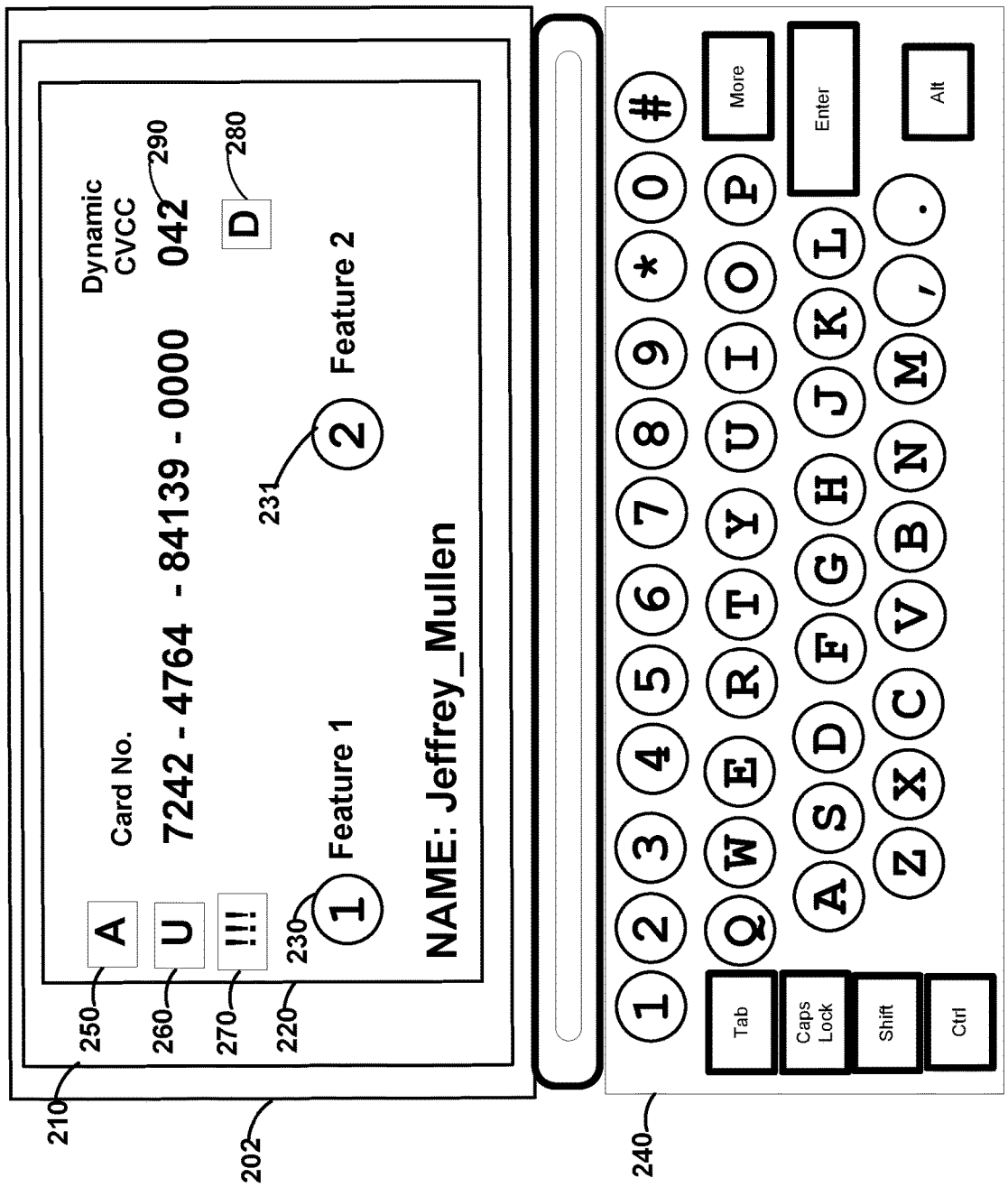
FIG. 2 shows devices constructed in accordance with the principles of the present invention.

FIG. 2 shows devices according to example embodiments. Referring to FIG. 2, device 200 may be, for example, a mobile telephonic device and/or other device (e.g., portable computer such as a portable tablet computer). Device 200 may include, for example, housing 202, display 210, device card 220, virtual buttons 230-232, virtual keyboard 240, selections 250-290, and/or dynamic code 290.

Display 210 may include, for example, light-sensitive and/or touch-sensitive elements. Device 200 may communicate information to a card reader, for example, via a contactless signal (e.g., an RFID signal) and/or a contact-based signal (e.g., a USB connection). Any of multiple different communication technologies may be used to communicate information to, for example, a card reader.

Device 200 may include a device card 220 and/or virtual buttons 230 and 231. Device card 220 may be a virtual representation of a card and/or any information identifying a payment method (e.g., credit account number). Persons skilled in the art will appreciate that any physical card described herein may be provided as a device card on, for example, a computing system (e.g., a mobile telephonic device and/or a computer). Physical buttons of a physical card may, for example, correspond to virtual buttons of a device card.

Virtual button 230 may, for example, correspond to one feature (e.g., an automatic association of a coupon to a purchase) from one service provider. Virtual button 231 may, for example, correspond to another feature (e.g., a virtual game reward) from the same or a different service provider. All features associated to a card may be utilized, for example, with a particular payment account (e.g., a credit account) such that a payment transaction with that payment account is performed if any feature is selected. As another example, one or more features may be associated with a payment account (e.g., a credit account) while an additional one or more features may be associated with a different payment account (e.g., a debit account). Accordingly, a selected feature associated with a credit account may be utilized to make a purchase with credit and may perform an additional action associated with that feature. A different selected feature associated with a debit account may be utilized to make a purchase with debit and may perform an additional action associated with that different feature.

Selection 250 may be, for example, a link to an application for a new card provided by, for example, an ecosystem provider, application manager provider, card manufacturer and/or the like. Upon activation of selection 250 a user may be directed to an application form. Selection 260 may be, for example, a link to an application for an upgrade to a new card provided by, for example, an ecosystem provider, application manager provider, card manufacturer and/or the like. Upon activation of selection 260 a user may be directed to an application form. According to at least one example embodiment, selections 250 and 260 may only appear upon availability to a user and may not require an application process (e.g., may be based on preapproval).

Selection 270 may be, for example, a link used to report a lost and/or stolen device, device card and/or physical card. Upon activation of selection 270 information may be automatically communicated to one or more responsible parties, for example, an issuer (e.g., for deactivation of the payment method). Selection 280 may be, for example, a link used to display a GUI. Upon activation of selection 280 an application manager used to associate features to virtual buttons, and virtual buttons to payment methods, may be displayed.

Dynamic code 290 may be, for example, a credit card number, a CVV and/or a CID. Dynamic code 290 may change based on an event, for example, based on a change in time, a counter and/or the like. Dynamic code 290 may change based on a transaction using, for example, a function and/or formula. For example, dynamic code 290 may change every transaction, every number of transactions, for a type of transaction (e.g., greater than $100 and/or using a debit card) and/or the like.

Figure 3:
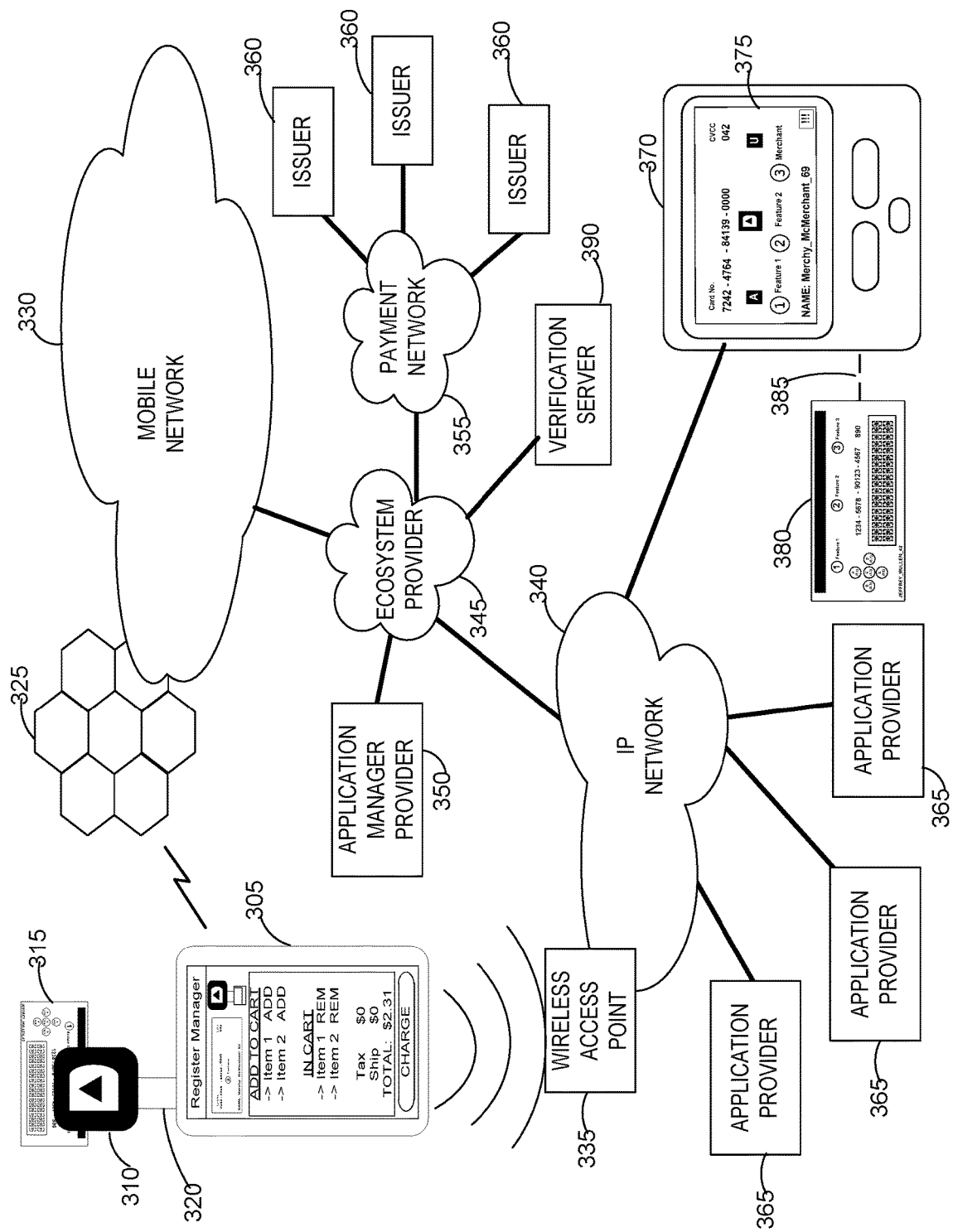
FIG. 3 shows network topologies arranged in accordance with the principles of the present invention.

FIG. 3 shows network topologies according to example embodiments. Referring to FIG. 3, network topology 300 may be a logical topology of a transactional network including multiple network elements. The network elements may include, for example, mobile device 305, card reader 310, card 315, network access infrastructure 325, wireless access point 335, mobile network 330, IP network 340, payment network 355, device 370, contactless device 380, issuers 360, application providers 365, ecosystem provider 345, application manager provider 350 and/or verification server 390.

Mobile device 305 may be, for example, a mobile telephonic device, a personal digital assistant (PDA), an electronic tablet, a laptop, a global positioning system (GPS), an MP3 player, a smartphone and/or the like. Mobile device 305 may be used by any transactional entity, for example, a user, a merchant, a biller, an enterprise, a government, a non-profit organization and/or the like. Card reader 310 may be, for example, a data input device configured to read data from a storage medium (e.g., card 315). For example, card reader 310 may receive data from a magnetic stripe, EMV chip, contactless (e.g., RFID) technology and/or the like. Card reader 310 may connect to mobile device 305 via, for example, interface 320. Interface 320 may be an input to, for example, any one of multiple ports of a mobile device 305, for example, an input to a universal serial bus (USB) port, MicroUSB port, 32-pin connector, a headphone jack, an Ethernet port and/or the like.

Ecosystem provider 345 may be an entity providing one or more ecosystems of applications and transactional methods, and may be, for example, a transaction processor (e.g., an issuer, a merchant acquirer, an acquirer processor, a payment network and/or the like). Application providers 365 may be, for example, entities providing and/or maintaining applications compatible with one or more ecosystems. Issuers 360 may be issuer processors and/or issuers of transactional methods compatible with one or more ecosystems (e.g., issuing financial institutions). Application manager provider 350 may be, for example, an entity providing an interface (e.g., a graphical user interface (GUI)), used to associate applications to payment methods and/or transaction types, within an ecosystem provided by ecosystem provider 345. Payment network 355 may be, for example, an entity routing transactional information between, for example, ecosystem provider 345 and issuers 360. Verification server 390 may be, for example, a remote processing facility verifying dynamic codes communicated during a transaction.

Ecosystem provider 345, application providers 365, application manager provider 350, issuers 360, payment network 355, and/or verification server 390 may be connected by, for example, IP network 340, mobile network 330, private networks, trusted networks, encryption networks, sub-networks and/or the like. Connections between network elements may be wired and/or wireless.

Mobile device 305 may include one or more transceivers, receivers and/or transmitters that may communicate with one or more wired networks (e.g., IP network 340 and/or payment network 355) and/or one or more wireless networks (e.g., mobile network 330). Mobile device 305 may, for example, communicate with a cellular station over a wireless radio interface (e.g., a global system for mobile communications (GSM) air interface and/or the like) that may be used by mobile device 305 to communicate information (e.g., voice and data) to cellular network access infrastructure 325 (e.g., one or more GSM base transceiver stations, base station controllers and mobile switching centers). Persons skilled in the art will appreciate that cellular network access infrastructure 325 may utilize any multiple access architecture, for example, a code-division multiple access architecture, a code-division multiple access architecture and/or a time-division multiple access architecture.

Mobile device 305 may, for example, communicate with wireless access point 335 over a wireless interface (e.g., a Bluetooth interface, Wi-Fi interface and/or the like). Mobile device 305 may, for example, access one or more wired networks (e.g., IP network 312 and/or payment network 314) and/or one or more wireless networks (e.g., mobile network 310) without the need to first gain access to cellular network access infrastructure 325.

Mobile device 305 may initiate a financial transaction with one or more network entities and/or devices. Transactional information (e.g., a payment account number and/or a card expiration date of a purchaser) may be used to process the financial transaction. The transactional information may be communicated to mobile device 305 from, for example, card 315 via card reader 310.

For example, a financial transaction may include a purchase of items for sale by a user. A purchaser's request to purchase the items may be initiated by a browser of mobile device 305 via an access point, for example, wireless access point 335 and/or cellular network access infrastructure 325. Mobile device 305 may obtain payment information via card reader 310 (e.g., when card 315 is swiped through card reader 310), and may communicate the payment information to one or more network elements for transactional processing. For example, payment information may be communicated to ecosystem provider 345 (e.g., a merchant acquirer).

Transactional processing may include multiple transactional events and associated transactional communication flows. Examples of transactional events may include authorizations, verifications, settlements, statement debits (e.g., piggyback events), statement credits, returns, partial returns, voids, adjustments and/or chargebacks. Examples of transactional communication flows may include authorization, batching, clearing and funding.

Authorization of a purchase may include mobile device 305 communicating transactional information to ecosystem provider 345. Based on the transactional information, ecosystem provider 345 may communicate a portion of the transactional information, all of the transactional information and/or information related to the user (e.g., a user-merchant) to one or more application providers 365 for provision of one or more features. In response to receiving transactional information and/or user information from ecosystem provider 345, the one or more application providers 365 may, for example, communicate a request for a statement credit and/or statement debit (e.g., a piggyback charge) to ecosystem provider 345. For example, a feature provided by an application provider 365 may include providing a rebate (e.g., statement credit) to a purchaser buying an item via the user and/or a monetary value to the user (e.g., statement credit) for selling a particular item using ecosystem provider 345 as a merchant acquirer. Ecosystem provider 345 may authorize the purchase, the statement credit and/or the statement debit, and/or request authorization from one or more of issuers 360. Authorization may include verifying that a dynamic code (e.g., account number, CVV and/or CID) included in transactional information is valid using verification server 390. Ecosystem provider 345 may, for example, communicate authorization of the purchase to mobile device 305 and/or decline to authorize the purchase.

Upon authorization of a purchase, payment transaction information may be recorded onto a receipt that may be delivered to mobile device 305 via any one or more delivery options (e.g., via a short messaging service of mobile network 330 and/or an email delivery service of IP network 340). A payment receipt may, for example, be provided to mobile device 305 as a proof-of-purchase object (e.g., a barcode) that may be provided to a display of mobile device 305 and read by other computing equipment (e.g., a barcode scanner) for proof-of-purchase confirmation.

Authorized transactions may be batched (e.g., aggregated) by mobile device 305 and/or by ecosystem provider 345. The batched transaction may be cleared by communicating (e.g., daily) the batched transactions to one or more of issuers 360 (routed by, for example, payment network 314), debiting the purchaser's account and communicating a monetary value from one or more of issuers 360 to ecosystem provider 345. Funding may include ecosystem provider 345 notifying mobile device 305 that funding has occurred and/or communicating the monetary value to mobile device 305 (and/or a financial institution associated with mobile device 305 in a case where ecosystem 345 is not the merchant's bank). Various fees may be deducted from the monetary value and paid to various entities during transactional processing.

Application providers 365 may provide features to a user at any one of the various stages of transactional processing. In some cases, a transaction may be reversed (e.g., a void or credit) after a user and/or purchaser receives a reward based on the transaction. For example, a user may sell an item to a purchaser, receive a statement credit and then the purchaser may return the purchased item. According to example embodiments, one or more of application providers 365 (and/or an entity providing a feature to an application provider 365) may be notified by ecosystem provider 345 that a transaction has been reversed. The one or more application providers 365 (and/or the entity providing a feature to an application provider 365) may take action based on the notification. For example, the one or more application providers 365 may reclaim a reward, add a charge to a user's and/or purchaser's statement, remove user authorization to use an application and/or the like.

Persons skilled in the art in possession of example embodiments will appreciate that many transactional models with different communication flows may be applied to example embodiments (e.g., closed or open loop) and transactions may be routed in various ways. For example, verification of a dynamic code may be performed at any stage of processing by various entities (e.g., payment network 355, issuers 360 and/or the like). As another example, although example embodiments described with respect to mobile device 305 may include transactional processing of transactional data by ecosystem provider 345 as a merchant acquirer, according to other example embodiments, ecosystem provider 345 may perform some or all of the functions of other network elements in addition to those described above with respect to mobile device 305. According to at least one example embodiment, ecosystem provider 345 may provide end-to-end "one stop" transactional processing and may perform the functions of payment network 355, application manager provider 350, issuers 360 and application providers 365.

Persons skilled in the art in possession of example embodiments will appreciate that features may be provided by ecosystem provider 345 and or application providers 365 in various ways. For example, although some example embodiments may include application providers 365 requesting the addition of a debit or credit to a transaction prior to authorization, according to other example embodiments, statement debit and/or credit requests from application providers 365 may be separate from transactional communication flows (e.g., separate from authorization, batching, clearing and/or funding) or at different points within a transactional communication flow.

Device 370 may be, for example, a server, a laptop computer, a PDA, a desktop computer, a mobile device, a stand-alone piece of electronic equipment, and/or the like. Contactless device 380 may be, for example, a powered card and/or a non-powered card (e.g., a powered payment card and/or a non-powered payment card). Device card 375 may be a virtual representation of contactless device 380 or may be an independent device card. Device 370 may include a contactless interface that may initiate, sustain, and/or terminate communication channel 385 between contactless device 380 and device 370. Contactless device 380 and device 370 may communicate via channel 385 using any number of contactless mediums, which may include for example, visible, audible, capacitive, electromagnetic, magnetic, and/or RF mediums.

Contactless device 380 may communicate transactional information to device 370 to initiate a financial transaction (e.g., a purchase) using, for example, an IC chip, RFID tag and/or a magnetic stripe communications device. Transactional information may be communicated from contactless device 380 to device 370 in support of, for example, processing of the financial transaction. For example, device 370 may communicate transactional information and a purchase amount to ecosystem provider 345. Ecosystem provider 345 may authorize the transaction and/or may obtain authorization from one or more of issuers 360. Authorization may include verifying that a dynamic code (e.g., account number, CVV and/or CID) included in transactional information is valid using verification server 390. Ecosystem provider 345 may communicate the authorization to device 370. The user may be provided a receipt upon authorization of the financial transaction.

Device 370 may batch the authorized transaction with other transactions and communicate the batched transactions to ecosystem provider 345, and/or ecosystem provider 345 may batch the transactions. Ecosystem provider 345 may request payment from one or more of issuers 360. The one or more issuers 360 may communicate a monetary value to ecosystem provider 345 and debit the user's account. Ecosystem provider 345 may communicate the monetary value to device 370 and/or notify device 370 that funding has occurred. Various fees may be deducted from the monetary value and paid to various entities during transactional processing.

Ecosystem provider 345 may associate transactional information to an application and/or an application provider 365 (e.g., one or more of application providers 365). Ecosystem provider 345 may communicate some or all of the transactional information to the application and/or application provider 365 associated to the transactional information. The application and/or an application provider 365 may communicate a request to ecosystem provider 345 (e.g., a request for a statement debit and/or credit). Ecosystem provider 345 may authorize the request, and/or communicate the request to one or more of issuers 360. A monetary value may be communicated to the application provider 365, for example, in exchange for provision of a feature. The feature may include, for example, providing a reward to a user of contactless device 380 and/or device 370 as either a purchaser and/or merchant.

Figure 4:
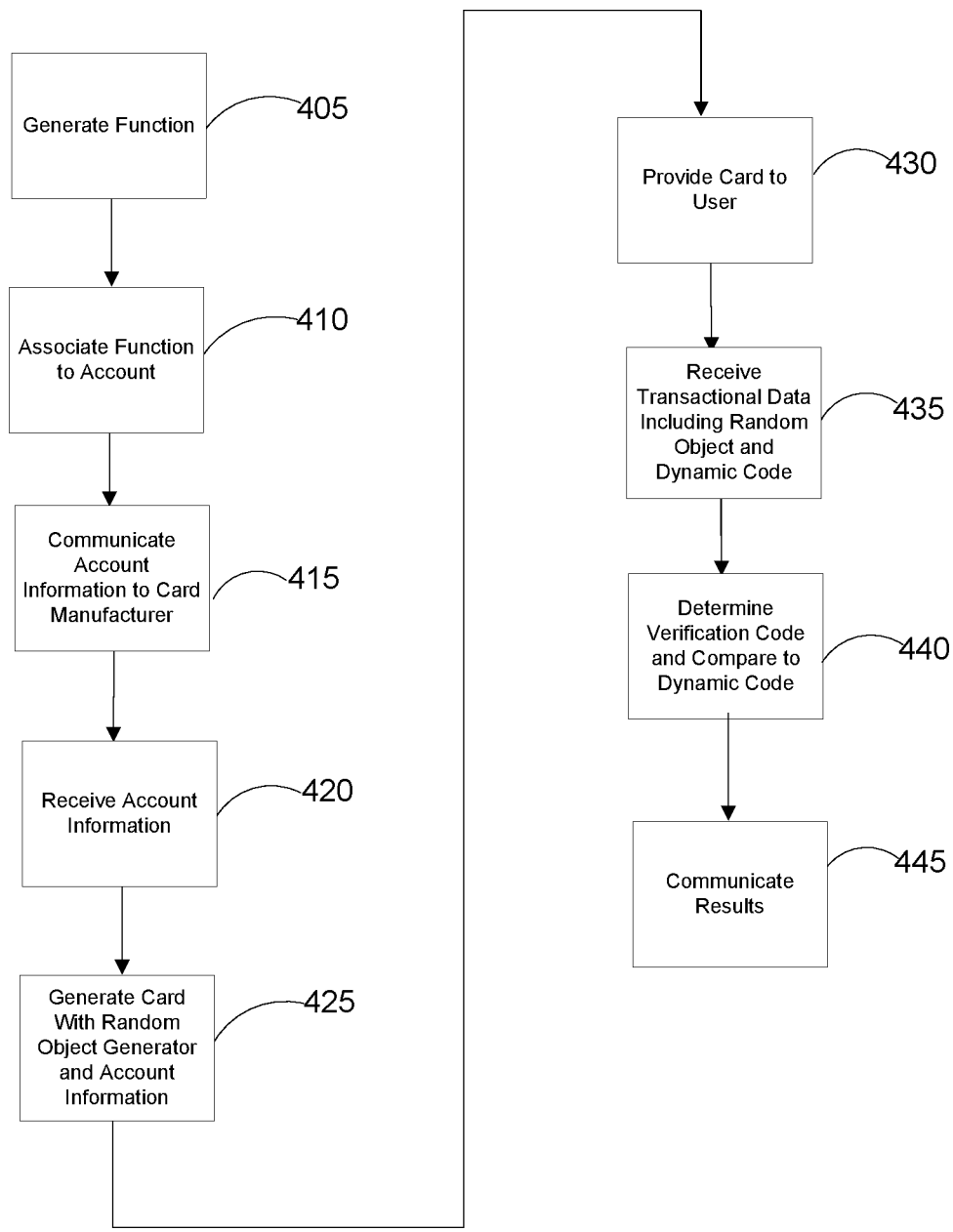
FIGS. 4-6 show transaction verification methods performed in accordance with the principles of the present invention.

FIG. 4 shows transaction verification methods according to example embodiments. Referring to FIG. 4, an account provider (e.g., a credit issuer) may generate one or more functions used to generate a dynamic number (e.g., as in 405). The account provider may associate the function to one or more accounts (e.g., as in 410) and communicate account information (including the function) to a card manufacturer (e.g., as in 415). The card manufacturer may be a separate entity from the account provider and/or the same entity. Persons skilled in the art will appreciate that no communication may occur in a case where the account provider and card manufacturer are a same entity.

The card manufacturer may receive the account information and generate a card (e.g., as in 420 and 425). The card may be, for example, a powered card and/or a device card. The card and/or device may include a random object generator and the account information. For example, a card may include a random and/or pseudo random number generator, the function and an identifier. The identifier may be a user identification, an account identification, a card identification and/or the like.

The card may be provided to the user of the account associated with the card (e.g., as in 430). The user may use the card to initiate a transaction. For example, the user may initiate a transaction with a card reader using the card. The card may generate a random object using the random object generator and determine a solution to the function, using the random object, to generate a dynamic code.

An entity processing the transaction (e.g., an acquirer, ecosystem provider and/or issuer) may receive transactional data including the random object, the dynamic code and the identifier (e.g., as in 435). The entity processing the transaction may retrieve a function (e.g., from local secure storage) using the identifier and may determine a solution to the function using the received random object to obtain a verification code. The verification code may be compared to the dynamic code to determine a result based on a degree of similarity (e.g., a match) between the verification and dynamic codes (e.g., as in 440). The result may indicate whether a dynamic number is valid and may be communicated, for example, to a card reader (e.g., as in 445).

Figure 5:
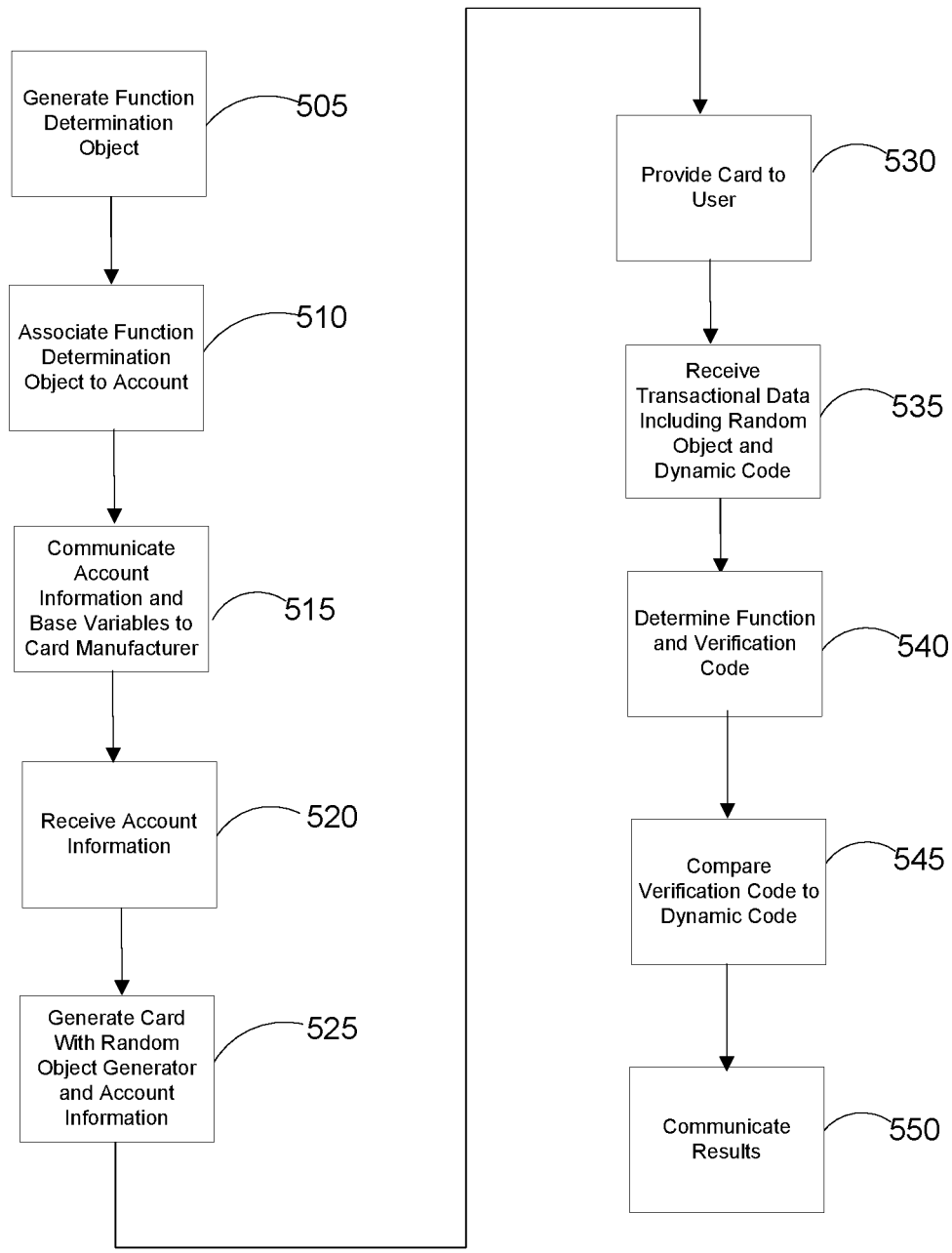

FIG. 5 shows transaction verification methods according to example embodiments. Referring to FIG. 5, an account provider (e.g., a credit issuer) may generate one or more function determination objects (e.g., as in 505). A function determination object may be, for example, a number defining function operators (e.g., mathematical operators, logical operators and/or the like) used with base variables to generate a function. The account provider may associate the function determination object to one or more user accounts (e.g., as in 510), and may communicate the base variables and account information (including the associated function determination object) to a card manufacturer (e.g., as in 515). The card manufacturer may be a separate entity from the account provider and/or the same entity. Persons skilled in the art will appreciate that no communication may occur in a case where the account provider and card manufacturer are a same entity.

The card manufacturer may receive the base variables and the account information, and may generate a card (e.g., as in 520 and 525). The card may be generated to include a random object generator, the base variables and the account information. For example, a card may include a random and/or pseudo random number generator, the function determination object, the base variables and an identifier. The identifier may be a user identification, an account identification, a card identification and/or the like. The card may be, for example, a powered card and/or a device card.

The card may be provided to the user of the account associated with the card (e.g., as in 530). The user may use the card to initiate a transaction. For example, the user may initiate a purchase with a card reader using a powered card to communicate information to the card reader. The information may include, for example, transactional data, such as a random object and a dynamic code, communicated in discretionary data fields. The card may generate the random object and dynamic code by generating a function using the base variables and the function determination object, generating a random object using the random object generator, and computing a solution to the function using the random object to generate the dynamic code.

For example, a card may determine function operators (e.g., addition, subtraction, multiplication and/or division) and/or the placement of function operators within a function using a look-up table (LUT). The function determination object may be used as a key to fields within the LUT. The card may combine the function operators and base variables to determine a function. The card may generate a random object (e.g., a random number) using the random object generator. The random object may be used to associate a value to each variable (e.g., via a LUT and/or using values taken directly from the random object). The base variables in the function may be replaced by the values and a solution to the function may be determined to generate a dynamic code.

According to example embodiments, the function may be defined for each transaction, upon initialization (e.g., turn-on) of a card and/or device and/or the like. The function may be defined, for example, upon personalization of a card for a user.

An entity processing the transaction (e.g., an acquirer, ecosystem provider, issuer and/or the like) may receive transactional data including the random object, the function determination object, the dynamic code and/or the identifier (e.g., as in 535). The entity processing the transaction may retrieve a function using the identifier or retrieve base variables to define the function using the received function determination object. The entity may determine a solution to the function using the received random object to obtain a verification code (e.g., as in 540). The verification code may be compared to the dynamic code to determine a result based on a degree of similarity (e.g., a match) between the verification and dynamic codes (e.g., as in 545). The result may indicate whether a dynamic code is valid and may be communicated, for example, to a card reader (e.g., as in 550).

Figure 6:
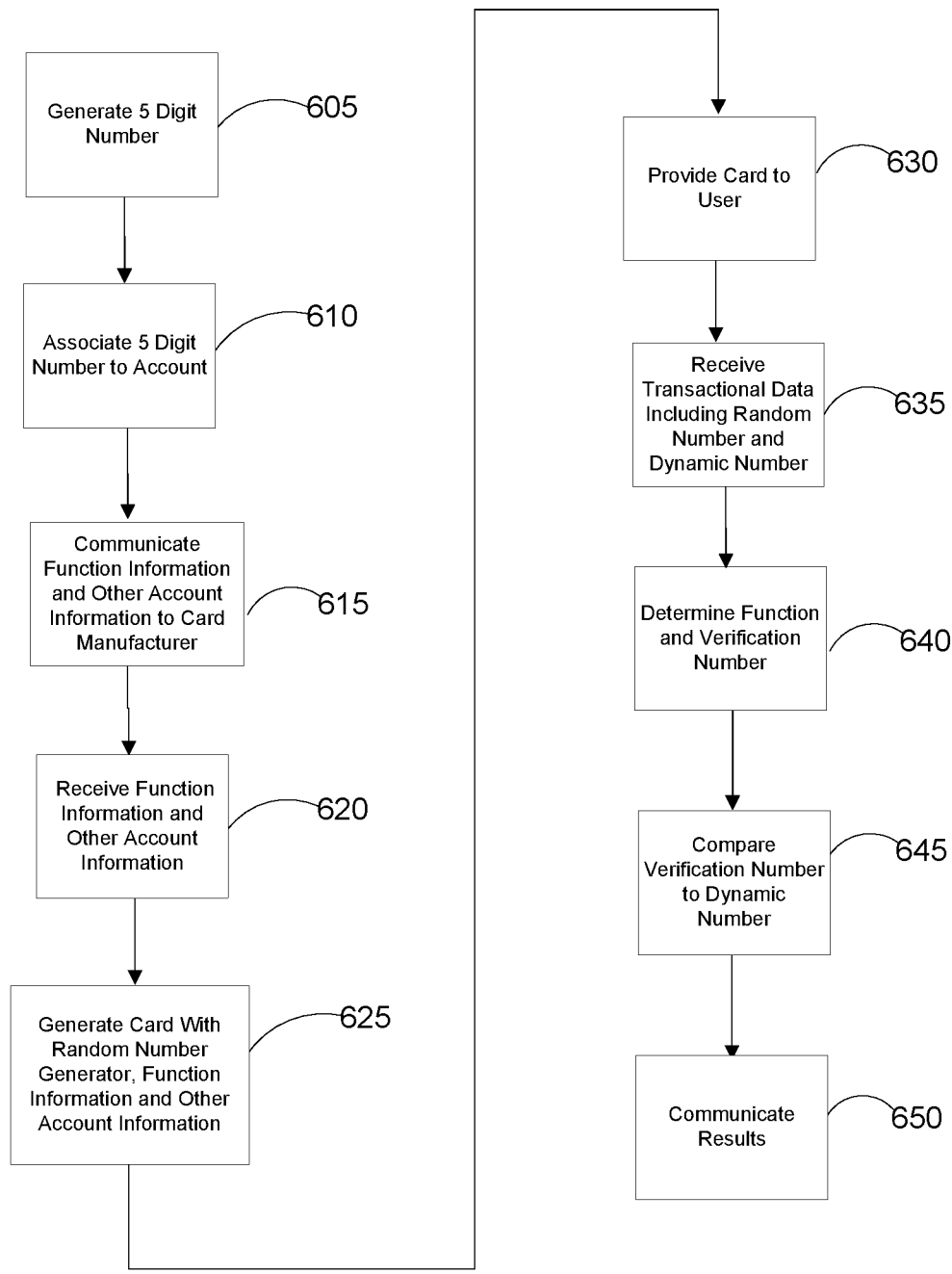

FIG. 6 shows transaction verification methods according to example embodiments. Referring to FIG. 6, an account provider (e.g., a credit issuer) may generate a five digit number, for example, using a random and/or pseudorandom number generator (e.g., as in 605). The five digit number may be usable to determine exponents and operators of a polynomial function including base variables. The polynomial function may, for example, include 3 base variables X, Y and Z, three exponent variables A, B and C, and two operator variables <operator1> and <operator2>. The polynomial function may be represented by, for example, equation 1.

$$X^A<\text{operator1}>Y^B<\text{operator2}>Z^C \qquad \text{Equation I.}$$

The first three digits of the five digit number may, for example, sequentially represent exponent values A, B and C. The last two digits of the five digit number may, for example, sequentially represent function operators <operator1> and <operator2>. Table 1 may include an example of a mapping between the last two digits of the 5 digit number to function operators.

TABLE I

| Value | Operator |
|---|---|
| 1 | Addition |
| 2 | Subtraction |
| 3 | Multiplication |
| 4 | Addition |
| 5 | Subtraction |
| 6 | Multiplication |
| 7 | Addition |
| 8 | Subtraction |
| 9 | Multiplication |

The account provider may associate the five digit number to one or more user accounts (e.g., as in 610), and may communicate function information (e.g., a five digit number, equation I, table I and account information) to a card manufacturer (e.g., as in 615). The card manufacturer may be a separate entity from the account provider and/or the same entity. Persons skilled in the art will appreciate that no communication may occur in a case where the account provider and card manufacturer are a same entity.

The card manufacturer may receive function and account information, and may generate a card (e.g., as in 620 and 625). The card may be generated to include a random number generator, the function information and the account information. For example, a card may include a random and/or pseudo random number generator, the five digit number, equation I, table 1 and an identifier. The identifier may be, for example, a user identification, an account identification, a card identification and/or the like. The card may be, for example, a powered card and/or a device card.

The card may be provided to a user of an account associated with the card (e.g., as in 630). The user may use the card to initiate a transaction. For example, the user may initiate a purchase with a card reader using a powered card to communicate information to the card reader. The information may include, for example, transactional data. The transactional data may include, for example, a random number and a dynamic code (e.g., a dynamic CVV and/or CID).

The card may generate the random number using the random number generator. The dynamic number may be generated using the random number, the five digit number, equation I and table I. For example, the random number may be a three digit number sequentially representing values of the base variables of equation 1 (e.g., X, Y and Z). The dynamic code may be generated by generating the polynomial function using equation I, table I and the five digit number, solving the polynomial function using the three digit random number and obtaining a result (e.g., directly, via truncation and/or the like). Table II may provide a non-limiting example of polynomial function generation using table I, and table III may provide a non-limiting example of dynamic code generation using polynomial functions of table II.

TABLE II

| Five Digit Random Number | 1$^{st}$ Digit A | 2$^{nd}$ Digit B | 3$^{rd}$ Digit C | 4$^{th}$ Digit <operator1> | 5$^{th}$ Digit <operator2> | Polynomial Function |
|---|---|---|---|---|---|---|
| 32167 | 3 | 2 | 1 | 6 | 7 | $X^3 * Y^2 + Z^1$ |
| 58542 | 5 | 8 | 5 | 4 | 4 | $X^5 + Y^8 - Z^5$ |

TABLE III

| Three Digit Random Number | 1$^{st}$ Digit X | 2$^{nd}$ Digit Y | 3$^{rd}$ Digit Z | Polynomial | Dynamic Code Calculation | Dynamic Code |
|---|---|---|---|---|---|---|
| 483 | 4 | 8 | 3 | $X^3 * Y^2 + Z^1$ | $4^3 * 8^2 + 3^1 =$ 4099 | 099 |
| 585 | 5 | 8 | 5 | $X^5 + Y^8 - Z^5$ | $5^5 + 8^8 - 5^5 =$ 16777216 | 216 |

Although example embodiments described with respect to FIG. 6 may be described using numbers and numbers of particular length, example embodiments are not so limited. Persons of ordinary skill in the art will appreciate that many variations are possible.

The polynomial function may be defined for each transaction, upon initialization and/or personalization (e.g., turn-on) of a card and/or device, and/or a like event. The polynomial function may be defined once and stored, for example, in a non-volatile memory of a powered card or a device including a device card.

An entity processing the transaction (e.g., an acquirer, ecosystem provider and/or issuer) may receive transactional data including the three digit random number, the dynamic number and/or the identifier (e.g., as in 635). The entity processing the transaction may retrieve the five digit number associated to the user's account (e.g., using the identifier) and may determine a function using the 5 digit number. The entity may determine a solution of the function using the received three digit random number to determine a verification number (e.g., as in 640). The verification number may be compared to the dynamic number to determine a result based on a degree of similarity (e.g., a match) between the verification and dynamic numbers (e.g., as in 645). The result may indicate whether a dynamic number is valid and may be communicated, for example, to a card reader (e.g., as in 550).

According to example embodiments, methods of verifying transactions may reduce unauthorized use of an account (e.g., unauthorized by a user), for example, without a requirement of bi-directional communication between a card (e.g., a powered card) and a processing entity and/or or without a requirement of synchronicity between the card and the processing facility. Persons of ordinary skill in the art in possession of example embodiments will appreciate that according to an example embodiment, about 2700 unique polynomial functions may be determinable. According to example embodiments, a function determination object and static information (e.g., base variables and/or tables) may be used to determine a function associated to an account and an amount of data stored by a verifying entity may be reduced.

Persons skilled in the art will appreciate that various elements of different example embodiments may be combined in various ways. Persons skilled in the art will also appreciate that the present invention is not limited to only the embodiments described. Instead, the present invention more generally involves dynamic information. Persons skilled in the art will also appreciate that the apparatus of the present invention may be implemented in other ways than those described herein. All such modifications are within the scope of the present invention, which is limited only by the claims that follow.

What is claimed is:

1. A method, comprising:
   receiving a random object, a dynamic code and an identifier;

obtaining a function determination object using the identifier;
determining a function using the function determination object;
determining a verification code using the function and the random object; and
comparing the verification code to the dynamic code.

2. The method of claim 1, further comprising:
authorizing a transaction based on the comparing the verification code.

3. The method of claim 1, wherein each of the random object, the dynamic code, the function determination object and the verification code include information indicative of a number.

4. The method of claim 1, wherein the determining a function includes obtaining a plurality of base variables, a plurality of exponents based on the function determination object, and at least one operator based on the function determination object and a look-up-table (LUT), and using the base variables, exponents and at least one operator to determine the function, and
the determining a verification code includes replacing the base variables with values based on the random object.

5. The method of claim 1, wherein the random object is a first three digit number,
the dynamic code is a second three digit number,
the function determination object is a five digit number,
the determining a function includes obtaining three base variables, three exponents based on three digits of the five digit number, and two operators from a look-up-table (LUT) based on two digits of the five digit number, and combining the base variables, exponents and operators to determine the function, and
the determining a verification code includes replacing each of the three base variables with a different digit of the first three digit number.

6. The method of claim 1, further comprising:
validating the dynamic code based on the comparing the verification code,
wherein the random object is a first three digit number,
the dynamic code is a second three digit number,
the verification code is a third three digit number,
the function determination object is a random five digit number,
the determining a function includes obtaining three base variables and three exponents, and obtaining two operators based on the five digit number and one or more fields of a look-up-table (LUT), and combining the base variables, exponents and operators to obtain a polynomial function,
the operators are each one of addition, subtraction, multiplication and division,
the determining a verification code includes replacing each of the three base variables with a different digit of the first three digit number, and obtaining a solution of the polynomial function, and
the validating the dynamic code includes communicating validation upon determining a match between the second and third three digit numbers.

7. The method of claim 1, wherein the dynamic code is one of a dynamic card verification value (CVV) and/or card identification number (CID).

8. A method, comprising:
generating a random object using a random object generator,
determining a dynamic code based on a function and the random object; and
communicating the random object, the dynamic code and an identifier to a processing device.

9. The method of claim 8, further comprising:
determining the function based on a function determination object.

10. The method of claim 8, further comprising:
determining the function based on a function determination object,
wherein the random object is a first three digit number,
the dynamic code is a second three digit number,
the function determination object is a five digit number,
the determining the function includes obtaining three base variables, obtaining three exponents based on the five digit number, and obtaining two operators from a look-up-table (LUT) based on the five digit number, and combining the base variables, exponents and operators to obtain a polynomial function, and
the operators are each one of addition, subtraction, multiplication and division.

11. The method of claim 8, further comprising:
determining the function based on a function determination object,
wherein the determining the function includes obtaining a plurality of base variables, and obtaining a plurality of exponents and at least one operator based on at least one of the function determination object and a look-up-table (LUT), and using the base variables, exponents and at least one operator to determine the function, and
the determining a dynamic code includes replacing the base variables with values based on the random object.

12. A device, comprising:
a random object generator configured to generate a random object;
a memory configured to store base variables, a look-up-table (LUT) and a function determination object;
a processor configured to determine a function based on the base variables, the function determination object and the LUT, and to determine a dynamic code based on the function and the random object; and
a communication interface configured to communicate the random object and the dynamic code to a processing entity.

13. The device of claim 12, wherein the device is a powered card.

14. The device of claim 12, wherein the device is a powered card, and
the dynamic code is one of a dynamic card verification value (CVV) and/or card identification number (CID).

15. The device of claim 12, wherein the random object is a first three digit number,
the dynamic code is a second three digit number,
the function determination object is a five digit number, and
the processor is configured to determine the function by obtaining three exponents and two operators based on at least one of the LUT and the five digit number, and to combine the base variables, exponents and operators to obtain a polynomial function, and to determine the dynamic code by substituting each digit of the first three digit number for a different one of the base variables in the polynomial function.

16. The device of claim 12, wherein the communication interface is configured to communicate the random object and the dynamic code to the processing entity via a card reader using at least one of a magnetic stripe communications device, a radio frequency identification (RFID) antenna, an exposed integrated circuit (IC) chip, and an EMV chip.

17. The device of claim 12, wherein the communication interface is configured to communicate an identifier.

18. The device of claim 12, wherein the communication interface is configured to communicate at least one of a user identification, an account identification and a card identification.

19. The device of claim 12, wherein the function is one of about 2700 unique polynomial functions.

20. A device, comprising:
- a random object generator configured to generate a random object;
- a memory configured to store a function;
- a processor configured to determine a dynamic code based on the function and the random object; and
- a communication interface configured to communicate the random object and the dynamic code to a remote facility.

* * * * *